US010142855B2

(12) United States Patent
Chang

(10) Patent No.: US 10,142,855 B2
(45) Date of Patent: Nov. 27, 2018

(54) CHANNEL BONDING USING K-MUXING AND MULTIPLE-BEAM ANTENNA

(71) Applicant: SPATIAL DIGITAL SYSTEMS, INC., Agoura Hills, CA (US)

(72) Inventor: Donald C. D. Chang, Thousand Oaks, CA (US)

(73) Assignee: SPATIAL DIGITAL SYSTEMS, INC., Agoura Hills, CA (US)

( * ) Notice: Subject to any disclaimer, the term of this patent is extended or adjusted under 35 U.S.C. 154(b) by 7 days.

(21) Appl. No.: 15/591,101

(22) Filed: May 9, 2017

(65) Prior Publication Data
US 2017/0366982 A1 Dec. 21, 2017

Related U.S. Application Data

(63) Continuation-in-part of application No. 13/274,782, filed on Oct. 17, 2011, now Pat. No. 9,647,347, which
(Continued)

(51) Int. Cl.
*H04W 16/28* (2009.01)
*H04W 72/04* (2009.01)
(Continued)

(52) U.S. Cl.
CPC ............ *H04W 16/28* (2013.01); *H01Q 1/007* (2013.01); *H01Q 1/2258* (2013.01); *H01Q 1/2266* (2013.01); *H01Q 3/24* (2013.01); *H01Q 3/2605* (2013.01); *H01Q 3/28* (2013.01); *H01Q 25/00* (2013.01); *H04W 72/0453* (2013.01); *H01Q 3/36* (2013.01); *H01Q 3/40* (2013.01); *H04J 13/0003* (2013.01); *H04J 13/004* (2013.01)

(58) Field of Classification Search
CPC ............ H04W 16/28; H04W 72/0453; H01Q 3/2605; H01Q 3/36; H01Q 3/28; H01Q 3/40; H01Q 1/007; H01Q 1/2258; H01Q 1/2266
See application file for complete search history.

(56) References Cited

U.S. PATENT DOCUMENTS 7,020,472 B2 * 3/2006 Schmidt ................ H04L 5/0005
370/329
7,190,683 B2 * 3/2007 Giallorenzi .......... H04B 7/2621
370/335
(Continued)

*Primary Examiner* — Jason Joseph
(74) *Attorney, Agent, or Firm* — Phuong-Quan Hoang

(57) ABSTRACT

A user terminal for transmitting data to a plurality of access points comprises a pre-processor to pre-process at least one source data stream and a multi-beam antenna. The pre-processor comprises a segmenting device to segment the at least one source data stream into a set of N data sub streams, N being an integer greater than 1; a K-muxing unit to perform a N-to-N K-muxing transform on the N data substreams to generate N K-muxed data streams, each of the N K-muxed data streams being a linear combination of the N data substreams; and a bank of modulators to modulate the N K-muxed data streams to generate N K-muxed signal streams. The multi-beam antenna comprises beam forming networks to transform the N K-muxed signal streams into transmit beams, and an array of antenna elements to transmit the transmit beams to the access points.

20 Claims, 18 Drawing Sheets

Related U.S. Application Data is a continuation-in-part of application No. 12/122,541, filed on May 16, 2008, now Pat. No. 8,107,569.

(60) Provisional application No. 60/930,958, filed on May 21, 2007, provisional application No. 60/930,957, filed on May 21, 2007.

(51) Int. Cl.
  *H01Q 3/26* (2006.01)
  *H01Q 3/28* (2006.01)
  *H01Q 1/00* (2006.01)
  *H01Q 1/22* (2006.01)
  *H01Q 3/24* (2006.01)
  *H01Q 25/00* (2006.01)
  H01Q 3/36 (2006.01)
  H01Q 3/40 (2006.01)
  H04J 13/00 (2011.01)

(56) References Cited

U.S. PATENT DOCUMENTS

| | | | |
|---|---|---|---|
| 2002/0193146 A1* | 12/2002 | Wallace | H04B 7/0417 455/562.1 |
| 2004/0014429 A1* | 1/2004 | Guo | H04B 7/0632 455/73 |
| 2005/0105632 A1* | 5/2005 | Catreux-Erces | H04B 7/0615 375/267 |
| 2007/0261082 A1* | 11/2007 | Ji | H04N 21/2662 725/62 |
| 2008/0108310 A1* | 5/2008 | Tong | H04B 7/0617 455/69 |
| 2009/0051592 A1* | 2/2009 | Lee | H04B 7/0408 342/368 |

* cited by examiner

CHANNEL BONDING USING K-MUXING AND MULTIPLE-BEAM ANTENNA

RELATED APPLICATIONS

This application is a continuation-in-part of application Ser. No. 13/274,782, filed on Oct. 17, 2011, which is a continuation-in-part of application Ser. No. 12/122,541, filed on May 16, 2008, now U.S. Pat. No. 8,107,569, issued on Jan. 31, 2012, which claims the benefit of Provisional Patent Application No. 60/930,957, filed on May 21, 2007, and the benefit of Provisional Patent Application No. 60/930,958, filed on May 21, 2007. This application is related to the following: U.S. Pat. No. 8,953,728 issued on Feb. 10, 2015, entitled "System for Processing Data Streams"; application Ser. No. 12/848,953 filed on Aug. 2, 2010, entitled "Novel Karaoke and Multi-Channel Data Recording/Transmission Techniques via Wavefront Multiplexing and Demultiplexing"; and application Ser. No. 14/793684 filed on Jul. 7, 2015, entitled "Data transport privacy and redundancy via small UAVs in cooperation", all of which are expressly incorporated by reference herein in their entireties.

BACKGROUND OF THE INVENTION

1. Field of the Invention

The present invention relates to techniques for improving the throughput and reliability of wireless links by bonding communication channels together. More particularly, the invention relates to techniques for using multi-beam antennas to communicate with spatially separated wireless access points that are then bonded to increase channel bandwidth. Channel bonding is an arrangement of communications links in which two or more links are combined for redundancy or increased throughput. Examples include links associated with network interfaces on a host computer, or downstream and upstream channels within a DOCSIS cable modem connection. Channel bonding is differentiated from load balancing in that load balancing divides traffic between network interfaces on per network socket (OSI model layer 4) basis, while channel bonding implies a division of traffic between physical interfaces at a lower level, either per packet (OSI model Layer 3) or a data link (OSI model Layer 2) basis. As techniques for "channel bonding" for redundancy and increased throughput, Wavefront Multiplexing (WF muxing or K-muxing) transforms will organize a data set to be transported by an N-channel connectivity. The data set is transformed into a N-dimensional (ND) data structure. Data component in each dimension will then be transported by one of the N-channel. Therefore K-muxing and corresponding K-demuxing is a technique to virtually aggregate N physical channels to function as a "fat" logical channel for data transport. The data structure for K-muxing is designed to provide better data privacy, enhanced availability via redundancy, and integrity monitoring capability

2. Description of Related Art

It is well known in the art to increase the bandwidth and reliability of a communication interface by combining, or bonding, two or more sets of interface hardware. A network interface card on a host computer, for example, may be limited to a certain maximum data rate. A second network interface card can be added to the host computer, and software running on the host computer can be made to divide up information packets across the two network interface cards such that portions of a message to be transmitted are sent over both network interface cards simultaneously. If each network card operates at its full bandwidth, the combined bandwidth of the entire system is effectively doubled. At the receiving end, the two network data streams are received simultaneously, and the receiving computer reassembles the transmitted data message by properly organizing the packets received from each of the two network interface cards.

Alternatively, the technique of adding a second network interface card to a host computer can be used to create redundancy for the transmission of important data. In this case, the host computer sends the same data packets over two independent network interface cards. The receiving computer compares the incoming data from the two channels to assure that the data is received without error. If a mismatch between the two channels is discovered, the receiving computer can request a retransmission of the corrupted data.

The channel bonding methods described above are generally applied to hard-wired connections over copper wire or fiber optics because such hard-wired systems provide good isolation between the two or more independent communication channels. When channel bonding is attempted over wireless networks, interference between the multiple wireless network cards can cause communication failures or excessively high error rates. To minimize interference, the multiple wireless systems can be tuned to different frequency channels. However, of the eleven channels in the 2.4-GHz frequency band of the IEEE 802.11b and g wireless standards, only channels 1 and 11 are spaced sufficiently far apart that they may be used simultaneously without excessive interference, limiting the channel-frequency choices. Furthermore, equipment that uses channel bonding on channels 1 and 11 will effectively use up the entire 802.11 spectrum, locking out any other wireless networks in the broadcast area. As a result of the competition for bandwidth of multiple network users, the overall data throughput may actually decrease.

A solution to this problem is to spatially separate the wireless data streams that are to be bonded in order to reduce interference from simultaneous transmissions that are at or near the same frequency. Current wireless network cards and laptop computer systems use omni-directional, low-gain antennas to communicate with wireless access points. Such antennas provide little spatial discrimination and are thus not suitable for this purpose. However, providing a dedicated processor to generate spatially separated beams can add significant complexity and cost. Accordingly, it would be useful to provide a wireless system that can communicate simultaneously over multiple, spatially separated beams that can be bonded into a single virtual channel to provide increased data bandwidth and/or improved communication channel reliability. It would further be useful to use existing processor resources to support digital beam forming to create a low-cost smart DBF antenna for consumer electronics.

SUMMARY OF THE INVENTION

A system is provided that enhances the throughput and reliability of wireless communications by providing multi-beam user terminals that exhibit directional discrimination. Multiple wireless communication channels are matched with multiple beams, and the channels are bonded into a single virtual channel, thereby increasing data bandwidth while reducing interference and multi-path effects that can degrade communications.

An embodiment of a wireless communication system in accordance with the present invention includes a media center that contains communication data to be sent wirelessly to one or more user terminals. The media center is physically attached to at least two wireless access points, such as those that comply with the IEEE 802.11 wireless networking specification. The media center divides the communication data to be sent into portions that will be broadcast from each of the access points. If the primary objective is to increase the speed of data transfer, the two portions will contain little if any overlapping data. If the primary purpose is to provide robustness, the two portions will contain significant amounts of overlapping data.

A user terminal is configured to receive the data from the two access points. The user terminal includes an antenna that is composed of at least two radiating elements. When signals from the access points arrive at the radiating elements of the array antenna, signals from each of the array elements are processed by a beam-forming processor. The beam-forming processor adjusts the amplitude and phase of the signals received from the individual antenna array elements in order to create at least two beams pointing in different directions. By properly adjusting the amplitude and phase of the received signals, they can be made to add coherently for certain directions and incoherently for other directions. The beam-forming processor is thus used to create one beam that points in a direction to the first access point and a second beam that points in the direction of the second access point.

The user terminal then demodulates the first beam and the second beam to recover the first data portion and the second data portion. The two portions are then bonded together to create a single virtual channel. If the two portions contain little data overlap, the effect of the bonding operation is to increase the data throughput by approximately a factor of two. On the other hand, if there is significant data overlap between the first and second portions, the effect is to improve the robustness of the wireless communication system by providing redundant data information without slowing the information transfer rate.

The beam forming process may be performed in either the analog or digital domain. In an analog system, the analog signals received from each element of the antenna array are routed through phase shifters to adjust their relative phase and through amplifiers to scale their amplitudes. The scaled and phase-shifted signals are then combined to form a composite coherent beam pointing in the selected direction. Simultaneously, a second set of phase shifters and amplifiers is used to adjust the same antenna array signals by different amounts to create a second coherent beam that points in a second direction. The directions of the coherent beams are set to point to the access points that are broadcasting the communication data.

In a digital beam-forming system, the signals from the antenna array are first digitized using an analog-to-digital (A/D) converter. The digital samples are then multiplied by complex beam weighting factors that include both amplitude and phase components. Different sets of weighting vectors will create beams pointing in different directions. The digital beam-forming processor may create any number of digital beams by multiplying the sampled data from the A/D converter by different sets of weighting vectors and then combining the weighted samples to form composite coherent beams.

In an embodiment of a beam-forming system in accordance with the present invention, the digital processing and formation of multiple beams is performed in a dedicated beam-forming processor. However, an alternative embodiment of a beam-forming system in accordance with the present invention uses already-existing processing resources to perform the beam-forming algorithms. For example, in a system using a laptop computer as the user terminal, a fraction of the processing power, typically 5% to 10%, of the laptop's general-purpose microprocessor would be reserved for real-time beam-forming processing. The beam-forming algorithms would thus run in the background, behind the other processing tasks of the laptop computer, and would demand processing resources as needed. Thus, the electronics associated with the transmit/receive antenna would simply convert received microwave waveforms to digital bit streams and would convert digital bit streams to transmitted microwave waveforms. The antenna would thus act as a low-cost smart DBF antenna that could be integrated with consumer electronics having inherent processing power that could be utilized. Software running on the main processor of the consumer electronics device would execute the beam-forming processing steps.

Behind the array antenna is a radio-frequency front end. This may comprise a low-noise amplifier (LNA) associated with each antenna element, followed by a band-pass filter and a frequency down-converter to convert the received radio-frequency signals to a lower intermediate frequency before being digitized by an A/D converter. Alternatively, because fast A/Ds may be capable of handing the 2.4 GHz signals of the IEEE 802.11 standard directly, the down-conversion stage may be eliminated, and digitization may take place directly at radio frequency.

The transmit side of a user terminal according to the present invention operates similarly. In transmit, a router splits data into two paths. The data in each of the paths is modulated onto a digital baseband waveform which is then sent to a digital beam forming (DBF) processor. Each DBF processor applies appropriate complex beam weighting factors to adjust the amplitudes and phases of the waveforms to be applied to the elements of the patch antenna array. As discussed above, the DBF processors could be dedicated units or the algorithms could execute on the primary processor of the host device to embed the beam-forming vectors into the digital data stream sent to the antenna. Analog waveforms are then synthesized from the digital baseband waveforms by D/A converters. The analog waveforms are then frequency up-converted to radio frequency, filtered, amplified by solid-state power amplifiers or similar devices, and applied to elements of the patch array. Note that with very high-speed D/A converters, direct radio-frequency synthesis may be possible, and the frequency up-conversion stage could then be eliminated.

In an alternative embodiment of a wireless communication system in accordance with the present invention, signals from the elements of the receiving array antenna may be combined before digitization in order to reduce the number of A/D converters required and to make the radio-frequency front end more conducive to being implemented in a radio-frequency integrated circuit (RFIC). In order to combine the signals in such a way that the individual signals from each antenna element can be recovered for subsequent beam-forming processing, a series of orthogonal modulating codes is used. The signal from each of the array elements is passed through a bi-phase modulator. The modulating input of each bi-phase modulator is driven by a pseudonoise (PN) code. The PN codes are chosen to be mutually orthogonal and are applied synchronously to the signals from each of the array elements. The modulated signals are then summed and digitized by a single A/D converter. In the digital domain, the composite sample stream is then convolved with each of the PN codes, and owing to the orthogonal nature of each of the codes, only the signal component originally modulated with that code will be recovered. Digital sample streams associated with each of the elements of the antenna array are thus presented to the digital beam forming processor, and multiple beams can be synthesized. As discussed previously, the digital beam forming unit could be a dedicated processing unit or could comprise a portion of the general-purpose microprocessor of the host device. In its most integrated form, a smart antenna in accordance with the present invention would comprise patch antenna elements and a radio-frequency integrated circuit. The RFIC would send digital data to the main microprocessor of the host device, which would calculate and apply the beam weight vectors to create multiple digital beams. In transmit, digital data would be multiplied by weighting vectors in the host microprocessor, and a digital data stream with embedded beam-forming vectors would be delivered to the RFIC, which would then transmit the data from the antenna elements.

From the foregoing discussion, it should be clear to those skilled in the art that certain advantages have been achieved in a communication system employing channel bonding over multiple antenna beams that achieve spatial separation, thereby reducing interference and increasing data bandwidth. Further advantages and applications of the invention will become clear to those skilled in the art by examination of the following detailed description of the preferred embodiment. Reference will be made to the attached sheets of drawing that will first be described briefly.

DETAILED DESCRIPTION

The invention provides a system for bonding multiple wireless communication channels using multi-beam directional antennas in order to improve communication bandwidth and reliability. In the detailed description that follows, like element numerals are used to indicate like elements appearing in one or more of the figures.

Figure 1:
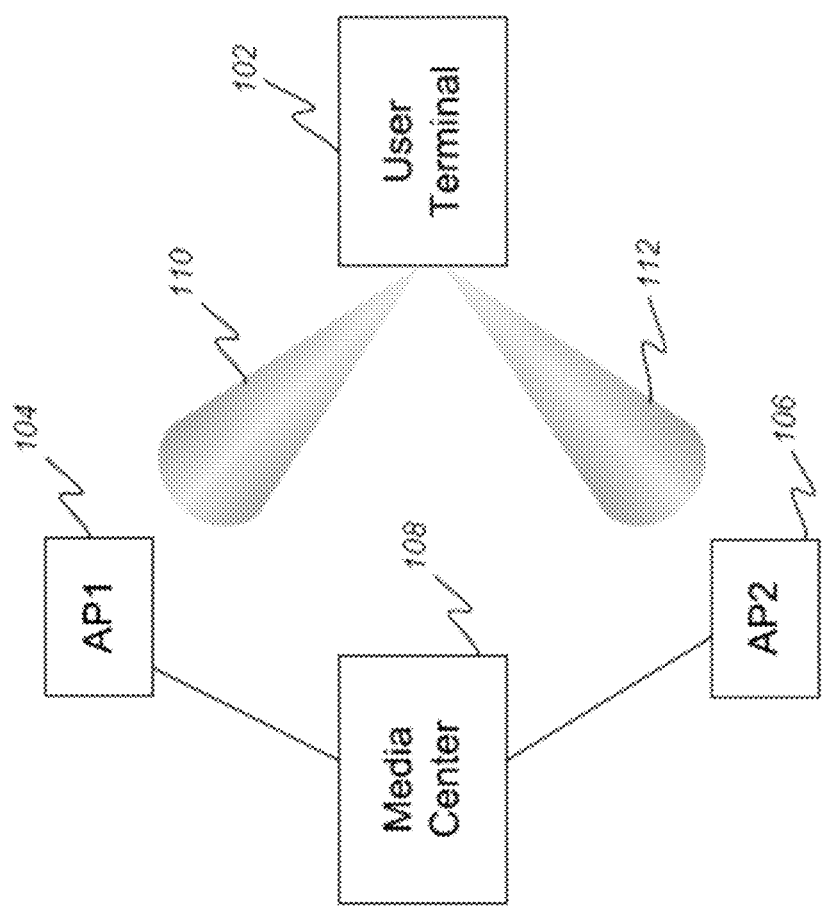
FIG. 1 depicts a media center connected to two spatially-separated wireless access points, and a multi-beam user terminal in accordance with the present invention.

FIG. 1 depicts a block diagram of an embodiment of a multiple-beam wireless networking system in accordance with the present invention. A media center 108 stores data that it makes available to a wireless network over two spatially separated wireless access points 104 and 106. A user terminal 102 includes a multi-beam antenna capable of pointing narrow beams 110 and 112 in the directions to the two access points 104 and 106, respectively. The user terminal 102 includes a digital-beam-forming (DBF) processor described in more detail below with reference to FIG. 3. The DBF processor allows the construction of two spatially-separated beams that can be independently steered toward the access points 104 and 106. Of course, more than two access points and more than two beams are also possible and would fall within the scope and spirit of the present invention. Because of the spatial separation achieved by the pointing of the two independent beams, both can operate at the same frequency without causing interference problems. Software well known in the art runs on the media center 108 and on the user terminal 102 to split network packets into portions that will be sent across a first path comprising the first access point 104 and the first user beam 110, and a second path comprising the second access point 106 and the second user beam 112. Since both access points operate at their full individual data rates, the amount of data received by the user terminal 102 in a given time is effectively doubled. Alternatively, a second copy of the data sent to the first access point 104 can also be sent to the second access point 106. The user terminal 102 then receives redundant copies of the same data from two independent sources. This redundancy can be used to improve the reliability and quality of the link while avoiding the reduction in data rate collateral to the use of error-correcting codes.

Wireless hubs or routers usually feature digital data buffers. One such a wireless hub or a router can play the role of the media center in FIG. 1, performing the functions of: receiving digital data, buffering the data, and re-transmitting the received or buffered digital data to designated users via IP networks including wireless networks.

Figure 2:
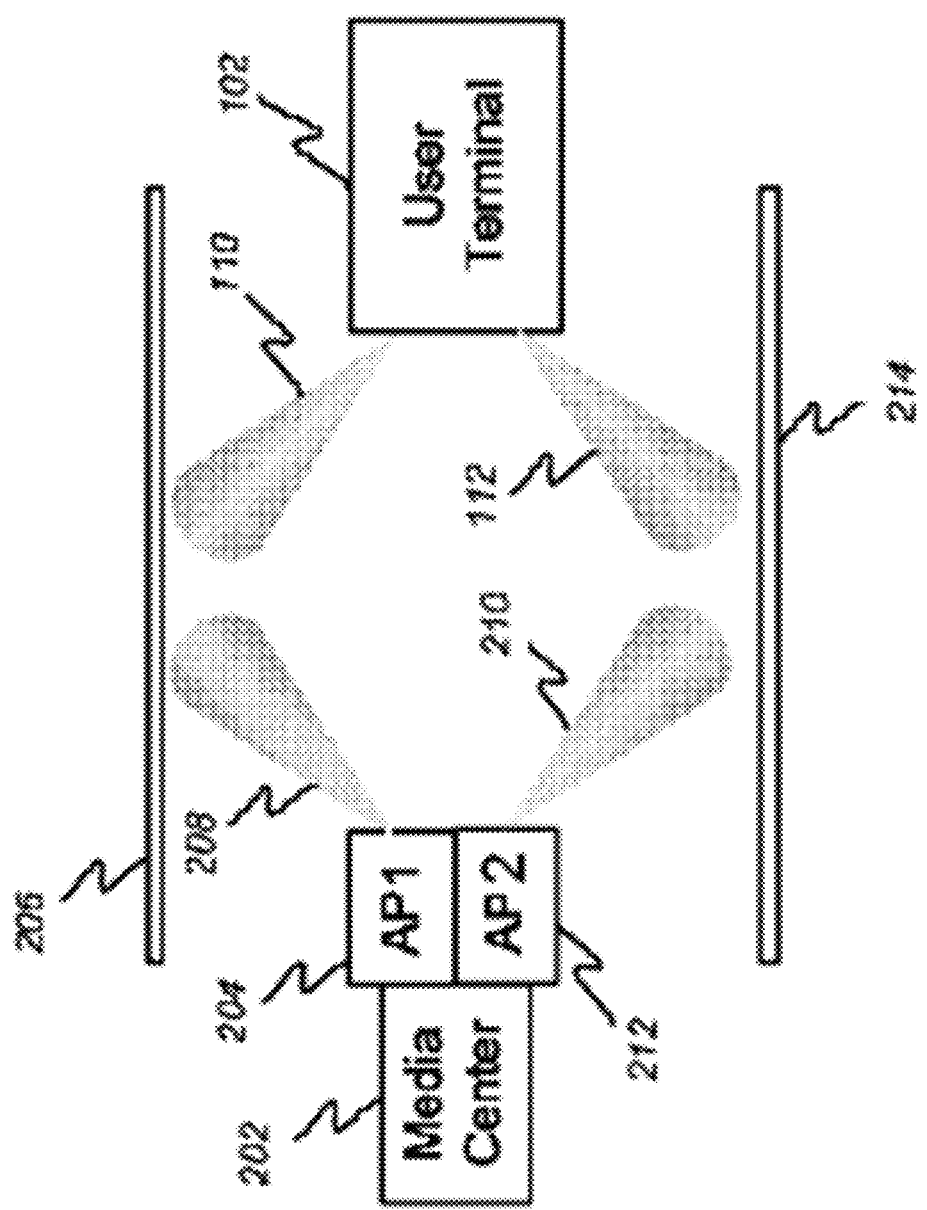
FIG. 2 illustrates an alternative embodiment of a multiple-beam channel bonding communication system in accordance with the present invention.

FIG. 2 illustrates an alternative embodiment of a multiple-beam wireless networking system in accordance with the present invention that does not require the access points to be spatially separated. The media center 202 is connected to two wireless access points 204 and 212 that may be located very close to one another. Each access point, however, includes a DBF processor and an appropriate array antenna that allows it to create a narrow, directional beam, i.e., 208 and 210. For an indoor application, each access point beam 208 and 210 can be directed toward a wall 206 and 214 or other surface that is capable of reflecting a portion of the incident energy. The user terminal 102, also includes a DBF processor and appropriate antenna elements allowing the creation of at least two beams 110 and 112 that are pointed in a direction to line up with the reflected energy from the access-point beams 208 and 210.

Of course, other configurations are possible in which the access-point beams 208 and 210 are pointed directly at the user terminal beams 110 and 112, as long as the directional selectivity of the beams is high enough to limit interference from the neighboring beam. Furthermore, systems that include more than two access points and more than two user-terminal beams also lie within the scope and spirit of the present invention.

Of course, an access point, AP1 204 or AP2 212 can feature more than one direction beams 208 or 210 to support multiple users concurrently and would fall within the scope and spirit of the present invention.

Figure 3:
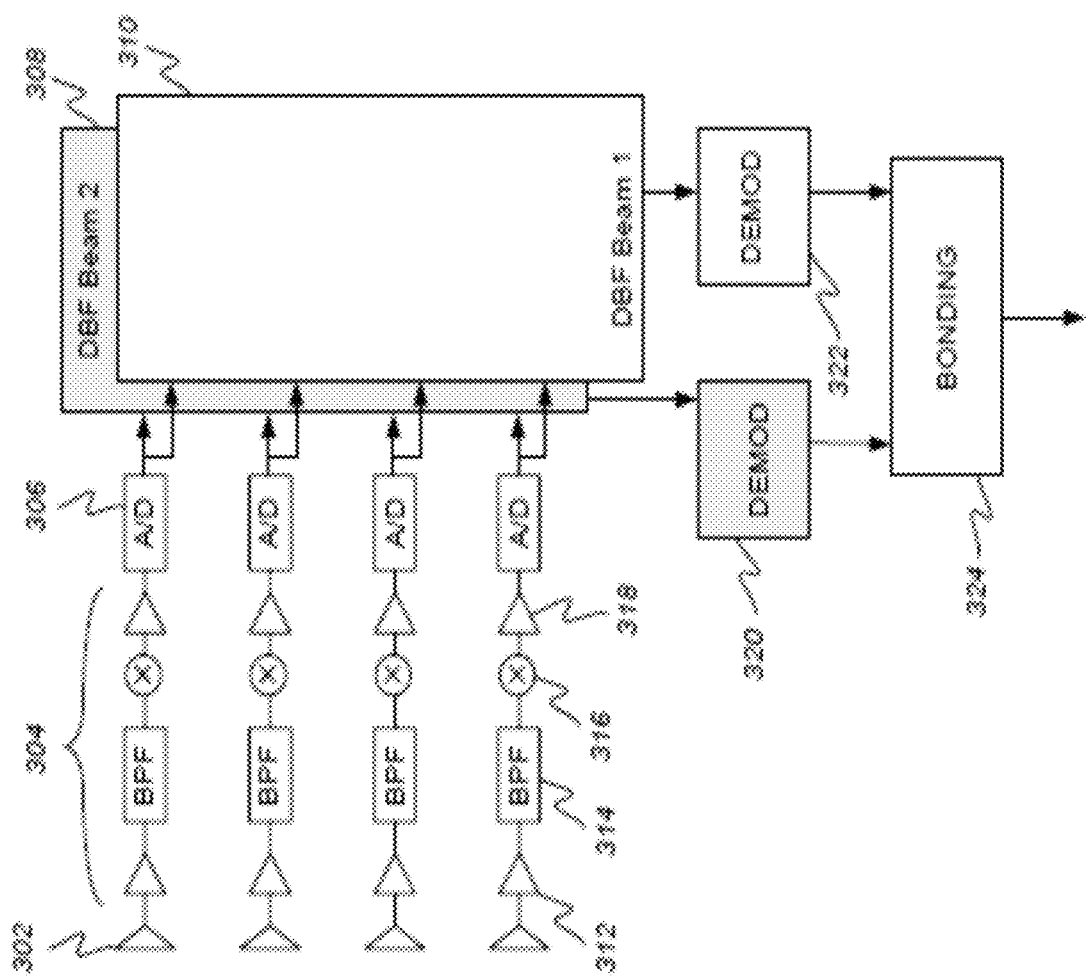
FIG. 3 is a block diagram of an embodiment of the receive portion of a user terminal in accordance with the present invention.

FIG. 3 is a block diagram of the receive side of an embodiment of a DBF system used to create multiple user-terminal beams in accordance with the present invention. The system depicted in FIG. 3 comprises a four-element array antenna. Each of the elements includes an antenna element 302, a radio-frequency front end 304, and an analog-to-digital converter 306. The radio-frequency front end 304 includes a low-noise amplifier 312, followed by a band-pass filter 314 to limit out-of-band noise, a frequency down-converter 316, and an intermediate-frequency or baseband-frequency amplifier 318. The analog-to-digital converter 306 samples the frequency-down-converted signals and presents the samples to two digital beam forming (DBF) processors 308 and 310 for processing the received radio-frequency signals. Of course, a single DBF processor may also be used that is capable of performing two independent beam calculations within the sampling rate of the A/D converters 306. At the 2.4 GHz IEEE 802.11 frequency band, it is also feasible to digitize the incoming signal directly at the RF frequency with a very fast A/D and high-speed digital processing. Such a system that eliminates the down-conversion hardware would also fall under the scope and spirit of the present invention.

The DBF processors 308 and 310 apply complex weighting factors to the signal samples received from each of the RF channels to adjust the amplitude and phase of the samples. The weighted samples are then combined by the first DBF processor 310 to form a coherent beam pointing in a first direction, and they are combined by the second DBF processor 308 with a different set of weighting factors in order to produce a coherent beam pointing in a second direction. Proper selection of the weighting factors used in the digital beam-forming process thus allows the received RF energy to be analyzed from two independent directions. As the distance between the antenna elements is increased, the width of the synthesized beams decreases, improving the directional selectivity of the antenna array.

For high-performance systems, the DBF processors 308 and 310 can be implemented in one or more dedicated beam-forming processors. However, for many systems utilizing a smart DBF antenna, there is excess processing power in the main processor of the host device or user terminal that can be used to perform the DBF function. For example, in a personal laptop computer using digital beam forming, a portion of the general-purpose microprocessor capacity, typically 5% to 10%, could be allocated to real-time processing of the digital-beam-forming algorithms. DBF processors 308 and 310 would then physically reside within the main host processor and would take advantage of the processing power already present in the system.

The summed coherent beam samples from the first DBF processor 310 and the second DBF processor 308 are then independently demodulated at 322 and 320 to recover the baseband data. The two baseband data streams are then passed to the bonding unit 324 that combines the data packets in order to recover the full message sent over the two spatially separated paths.

Figure 4:
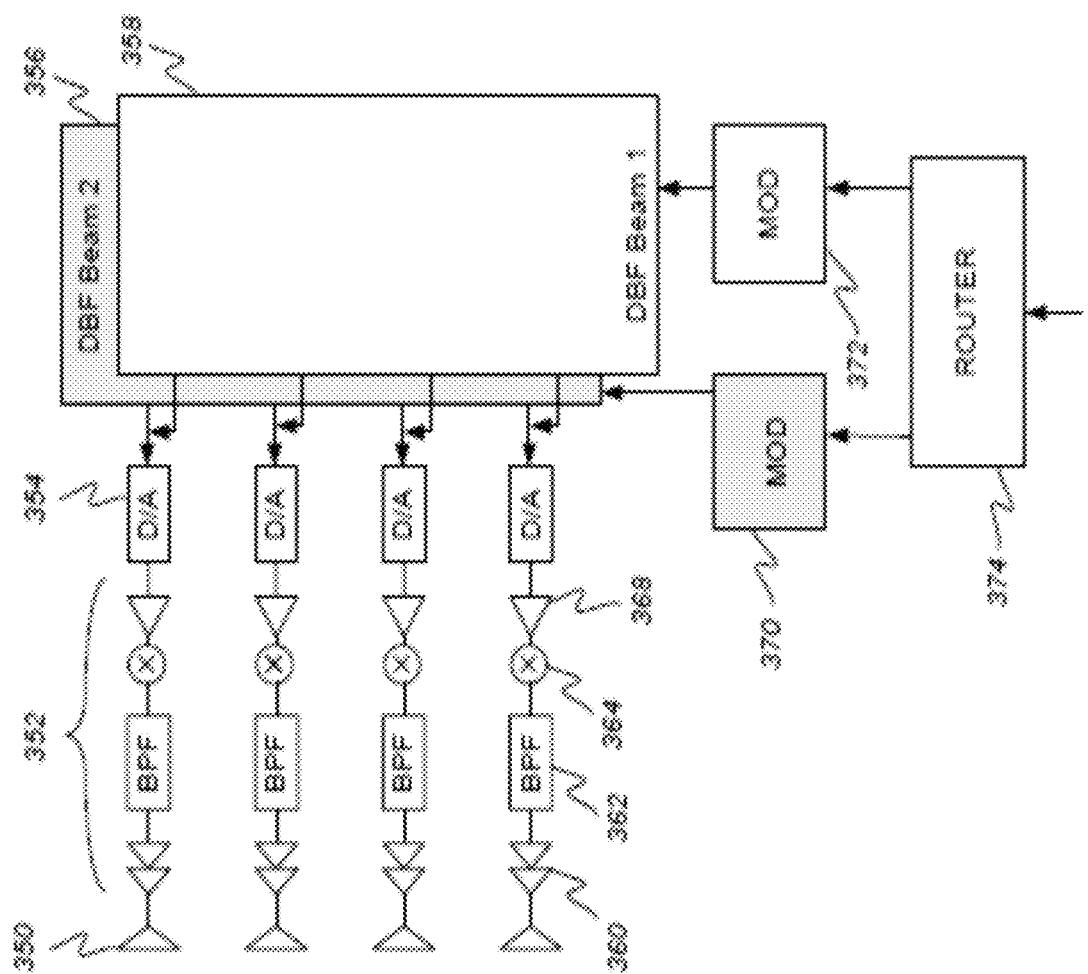
FIG. 4 is a block diagram depicting an embodiment of the transmit portion of a user terminal in accordance with the present invention.

FIG. 4 is a block diagram of the transmit side of an embodiment of a DBF system used to create multiple user-terminal beams in accordance with the present invention. Data to be transmitted is sent to a router 374 that splits the data into two separate paths in order to take advantage of the full bandwidth of each path. The data streams are modulated by modulators 372 onto baseband digital waveforms that are then sent to two digital beam forming (DBF) processors 356 and 358. Note that a single DBF processor that is fast enough to multiplex both beams could also be used. Furthermore, the DBF processors could be implemented within the main microprocessor of the host device, as described previously. Each DBF processor 356 and 358 applies complex beam weighting vectors to each digital baseband waveform in order to create four weighted outputs from each data stream destined for the elements of the patch array antenna 350. The phase and amplitude profile imparted by the DBF processor to each set of baseband data will direct each data stream in a separate direction as it leaves the antenna 350. Each of the weighted digital waveforms is then routed through a digital-to-analog (D/A) converter 354 to synthesize an analog baseband waveform. The analog waveform is then amplified 368 and frequency up-converted 364 to radio frequency. Note that very high-speed D/As may enable direct synthesis at radio frequency, in which case, the frequency up-conversion stage may be eliminated. The up-converted RF signals are then band-pass filtered 362, amplified by solid-state power amplifiers 360 or similar RF amplifiers, and applied to the elements of the patch array 350.

Figure 5:
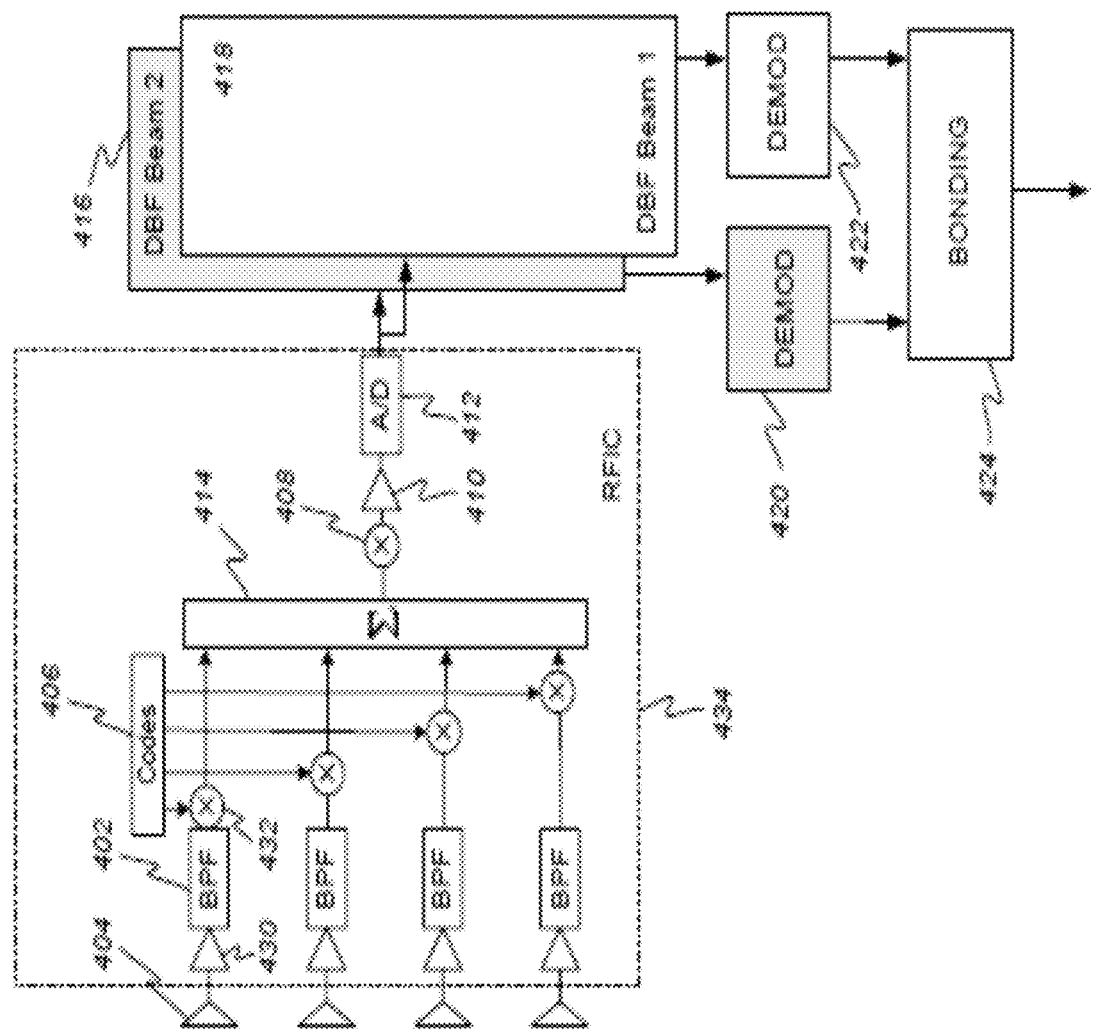
FIG. 5 is a block diagram of an alternative embodiment of a user terminal in accordance with the present invention.

FIG. 5 is a block diagram of an alternative embodiment of a user terminal in accordance with the present invention. An antenna aperture is comprised of four antenna elements 404. Each element is connected to a low-noise amplifier 430 and then to a band-pass filter 402. In order to reduce the number of analog-to-digital converters required, the signals from the four antenna elements are then mixed with orthogonal codes that enable the four signal streams to be combined, digitized, and then subsequently separated out into constituent streams. A code generator 406 generates four separate mutually orthogonal pseudorandom codes that are synchronous with each other. Each code is applied to a bi-phase modulator 432 in order to modulate the signal stream from the corresponding antenna element. The four modulated signal streams are then combined in a summing unit 414. The combined data stream is then frequency down-converted to an intermediate frequency at 408, amplified at 410, and then digitized by a single analog-to-digital converter. Of course, with a sufficiently high-speed analog-to-digital converter, it is possible to digitize directly at the RF frequency and eliminate the down-conversion stage 408. The coding, combining, and digitizing steps are well suited to integration into a single radio-frequency integrated circuit (RFIC) as indicated by the dashed border 434.

The digitized data stream is then passed to the digital beam forming processors 416 and 418. Convolving the digitized data stream with the same orthogonal synchronized code sequences used to combine the individual antenna-element data streams allows the individual streams to be extracted. The extracted digitized streams from the four antenna elements are then multiplied by a first set of complex weighting vectors in the first DBF processor 418 to form a coherent beam pointing in a first direction. They are also multiplied by a second set of complex weighting vectors in the second DBF processor 416 to form a coherent beam pointing in a second direction. The two beams are then demodulated at 420 and 422 and the extracted data packets are then combined in the bonding unit 424 to create a virtual channel with twice the bandwidth of each individual beam. It should be appreciated that a system with more or fewer than four antenna elements or with more than two synthesized beams would also fall within the scope and spirit of the present invention.

Similar orthogonal code processing may be employed on the transmit side in order to reduce the number of D/A converters and frequency up-converters required. This would be particularly advantageous for systems synthesizing directly at radio frequency that would require an expensive and high performance D/A converter.

Figure 6A:
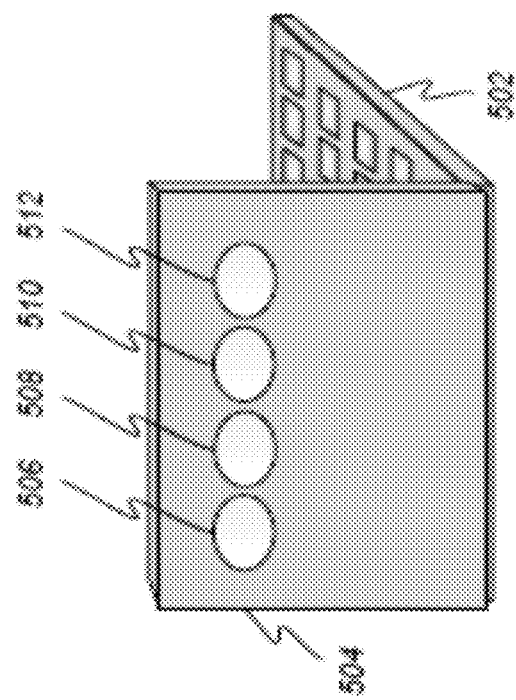
FIGS. 6A and 6B depict perspective views of an embodiment of a user terminal comprising a laptop computer with a four-element patch antenna array.
Figure 6B:
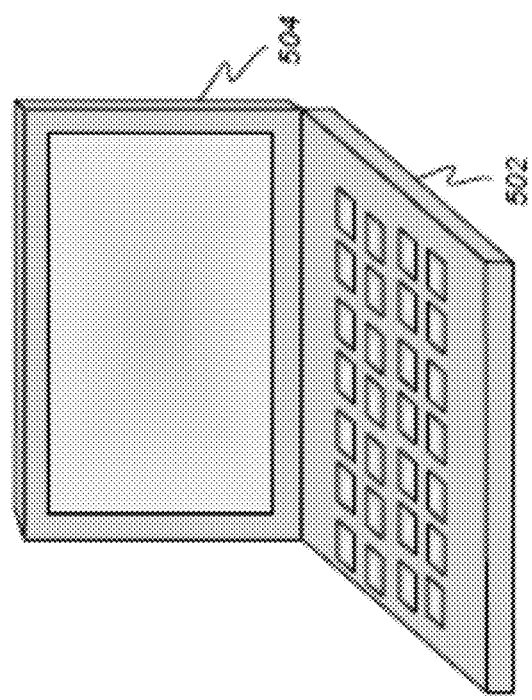

FIGS. 6A and 6B are front and rear perspective views of a laptop computer system incorporating a four-element array antenna in accordance with an embodiment of the present invention. The laptop computer includes a keyboard portion 502 and a screen portion 504. On the back of the screen portion 504, four antenna patch elements 506, 508, 510, and 512 are located. The radio-frequency integrated circuit 434 and DBF processing hardware 416 and 418 (see FIG. 4) may be located within the laptop housing. The DBF processor may also be integrated with the main laptop processor, which would be configured to dedicate a fraction of its computational power to the digital-beam-forming algorithm. It should be appreciated that other configurations of a patch-antenna array, including configurations that use more or fewer than four elements, would fall within the scope and spirit of the present invention.

Figure 7:
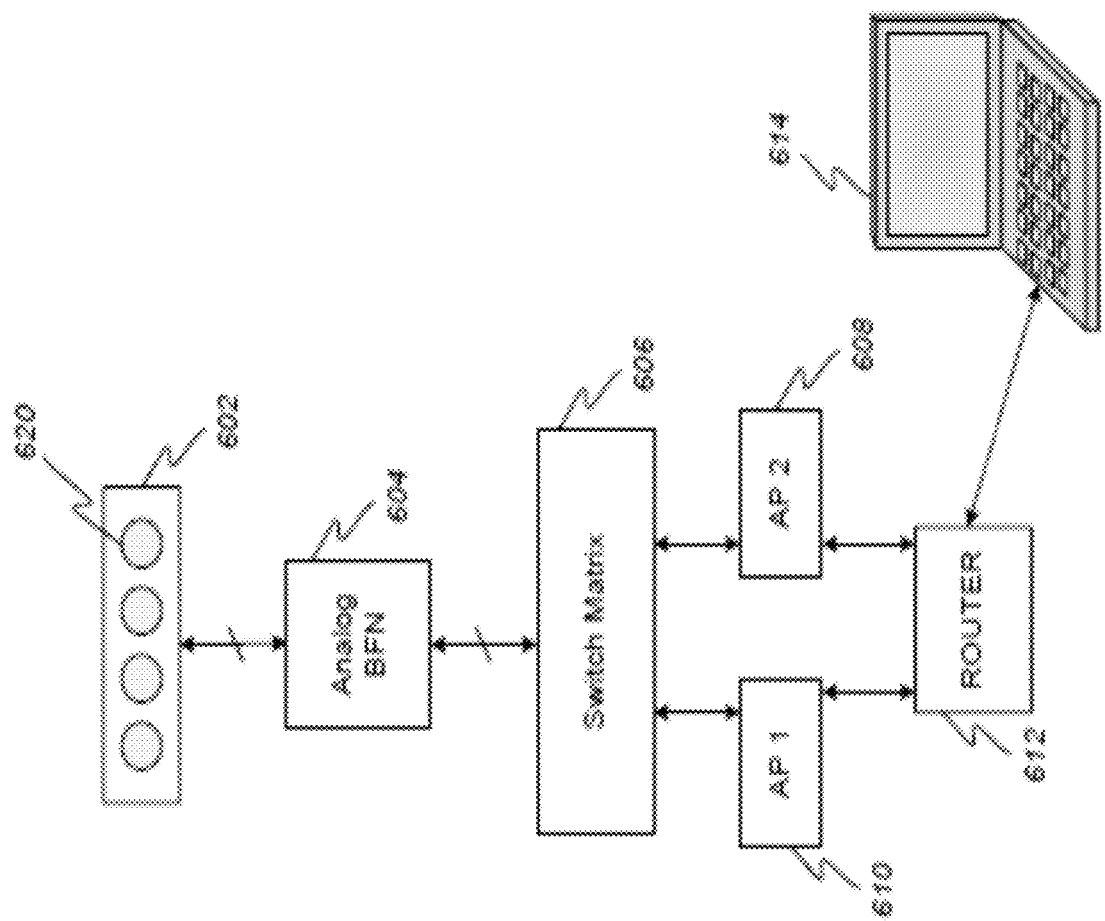
FIG. 7 depicts a block diagram of an embodiment of a user terminal constructed from commercial-off-the-shelf networking components.

FIG. 7 is a block diagram of a system demonstrating a multi-beam channel bonding system in accordance with an embodiment of the present invention. The system depicted in FIG. 7 is built using commercial off-the-shelf (COTS) components and features an analog multi-beam beam former 604 rather than a digital beam forming system.

An example of an analog multi-beam beam former, or beam forming network (BFN) is a four-by-four Butler Matrix that has four element ports and four beam ports. Such a device is capable of forming four orthogonal beams simultaneously. The four element ports are the inputs in receive mode and the outputs in transmit mode. Similarly, the four beam ports are the outputs in receive mode and the inputs in transmit mode. These four beams point in four fixed directions and cover approximately one quarter of the entire field of view.

To transmit data, a computer 614 communicates with an Ethernet router 612 that communicates with two wireless access points 610 and 608 implementing the IEEE 802.11 protocol. A bi-directional switch matrix 606 includes two inputs and four outputs and serves as a beam-selection mechanism, connecting two of the four available beams individually to the communication paths. The switch matrix 606 routes the output of each access point 610 and 608 simultaneously to two of the four inputs of the analog beam forming network (BFN) 604. The analog BFN 604 simultaneously divides each of the two input signals into four paths, applies appropriate phase and amplitude weighting individually to the two signals from the access points 608 and 610, sums the two weighted signals in each of the four paths, and then routes them to the four elements of the patch array 602. The phase and amplitude factors applied by the analog BFN 604 cause a transmitted beam to be radiated in one of four directions that can be selected via the switch matrix. The direction of the beam radiated by the patch array 602 can be changed by selecting different switch positions in the switch matrix 606 to apply different signals to the inputs of the BFN 604.

In receive mode, the system works similarly. The signals detected by each of the four radiating elements, e.g., 620, are passed to the analog beam former 604 which then applies the appropriate phase and amplitude correction factors to cause the four signals to add coherently. The switch matrix is set such that the coherent beam from a first direction is switched to the first access point 610, and the coherent beam from a second direction is switched to the second access point 608. The Ethernet router 612 combines the packets from each of the two access points and bonds them into a single virtual channel with enhanced bandwidth.

Thus, a multi-beam system is achieved that uses beam forming to spatially separate simultaneous wireless network connections and then bond them together for enhanced bandwidth and reliability. Those skilled in the art will likely recognize further advantages of the present invention, and it should be appreciated that various modifications, adaptations, and alternative embodiments thereof may be made within the scope and spirit of the present invention. The invention is further defined by the following claims.

Figure 8:
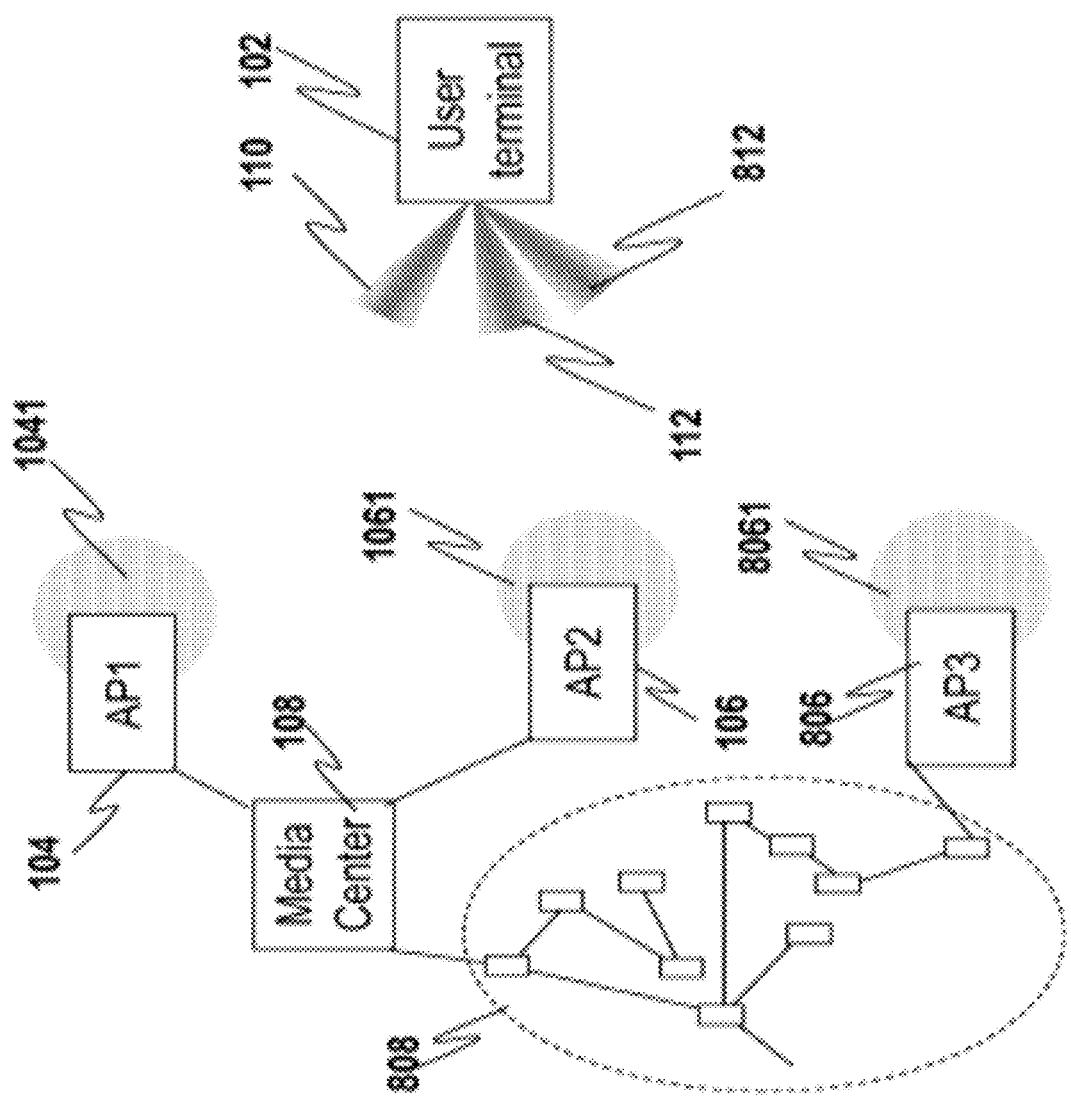
FIG. 8 depicts a media center connected to three spatially-separated wireless access points, and a multi-beam user terminal in accordance with the present invention; All APs feature Omni directional antenna patterns for both transmitting and receiving functions and one of the APs are connected through IP networks.

FIG. 8 depicts a block diagram of an embodiment of a multiple-beam wireless networking system in accordance with the present invention. A media center 108 stores data that it makes available to a wireless network over three spatially separated wireless access points AP1 104, AP2 106 and AP3 806. AP3 806 is connected via an IP network 808. All three APs feature omni-directional radiation patterns. More specifically the pattern 1041 is associated with AP1 104, the pattern 1061 with AP2 106, and the pattern 8061 with AP3 806. A user terminal 102 includes a multi-beam antenna capable of pointing three narrow beams 110, 112 and 812 in the directions to the three access points 104, 106 and 806, respectively. The user terminal 102 includes a DBF processor described in more detail below with reference to FIG. 3. The DBF processor allows the construction of three spatially-isolated beams that can be independently steered toward the access points AP1 104, AP2 106 and AP3 806.

Because of the spatial separation achieved by the pointing of the three independent beams, all can operate at the same frequency concurrently without causing interference problems. Software well known in the art runs on the media center 108 and on the user terminal 102 to split network packets into portions that will be sent across a first path comprising the first access point AP1 104 and the first user beam 110, a second path comprising the second access point AP2 106 and the second user beam 112, and a third path comprising the third access point AP3 806 and the third user beam 812. Since all three access points operate at their full individual data rates, the amount of data received by the user terminal 102 in a given time is effectively tripled.

Wireless hubs or routers usually feature digital data buffers. One such a wireless hub or a router can play the roles of the media center 108 in FIG. 8; receiving digital data, buffering the data, and re-transmitting the received or buffered digital data to designated users via IP networks including wireless networks.

Figure 9:
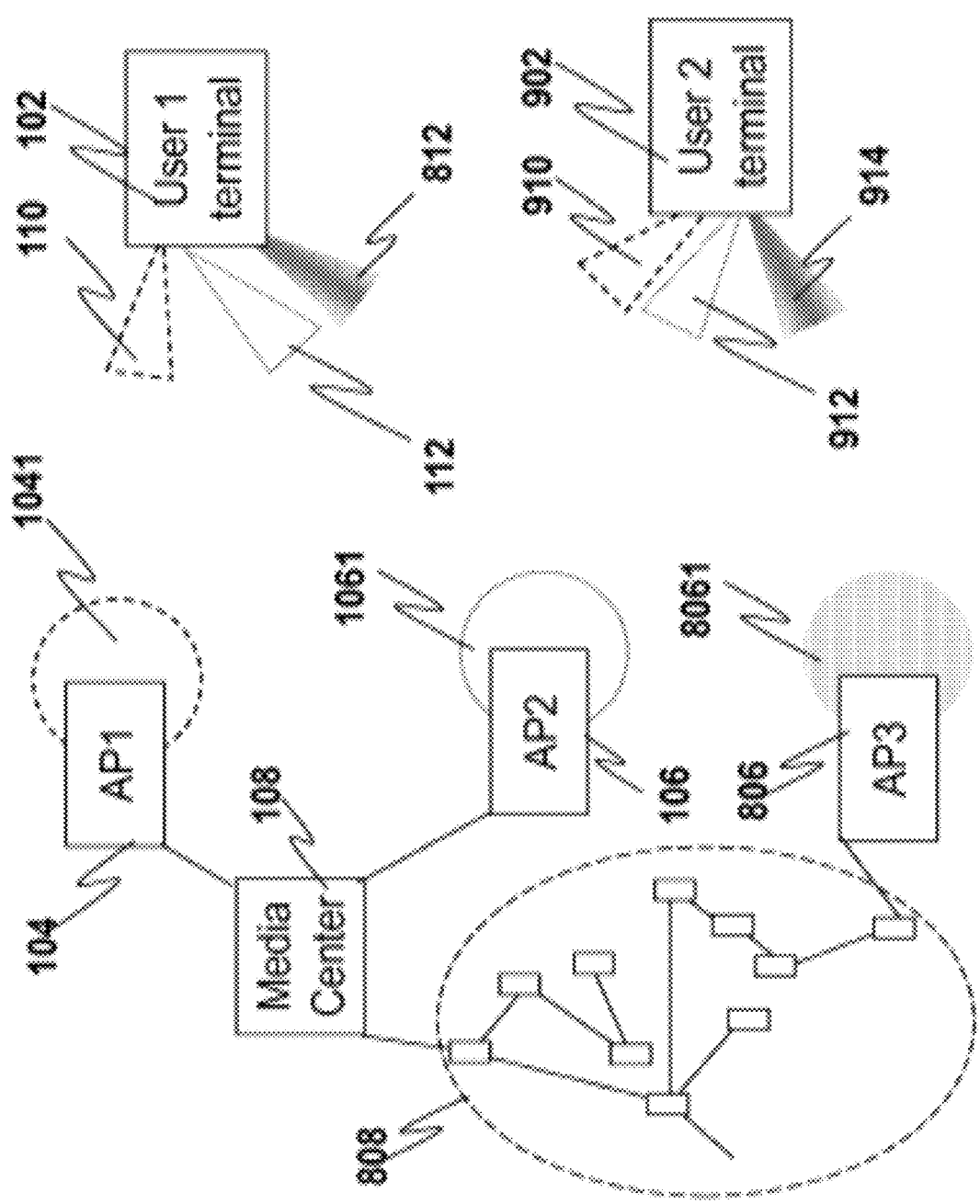
FIG. 9 depicts a media center connected to three spatially-separated wireless access points, and two multi-beam user terminals in accordance with the present invention; All APs feature Omni directional antenna patterns for both transmitting and receiving functions and one of the APs are connected to the media center through IP networks.

FIG. 9 depicts a block diagram of an embodiment of a multiple-beam wireless networking system in accordance with the present invention. A media center 108 stores data that it makes available to a wireless network over three spatially separated wireless access points AP1 104, AP2 106 and AP3 806. AP3 806 is connected via an IP network 808. All three APs feature Omni-directional radiation patterns. More specifically the pattern 1041 is associated with AP1 104, the pattern 1061 with AP2 106, and the pattern 8061 with AP3 806. This network supports two user terminals 102 and 902. The first user terminal 102 includes a multi-beam antenna capable of pointing three narrow beams 110, 112 and 812 in the directions to the three access points 104, 106 and 806, respectively. The second user terminal 902 includes a multi-beam antenna capable of pointing three narrow beams 910, 912 and 914 in the directions to the three access points 104, 106 and 806, respectively. Both user terminals 102 and 902 include a DBF processor described in more detail below with reference to FIG. 3. The DBF processor allows the construction of three spatially-isolated beams that can be independently steered toward the access points AP1 104, AP2 106 and AP3 806.

Wireless hubs or routers usually feature digital data buffers. One such a wireless hub or a router can play the roles of the media center 108 in FIG. 9; receiving digital data, buffering the data, and re-transmitting the received or buffered digital data to designated users via IP networks including wireless networks.

Because of the spatial separation achieved by the pointing of the three independent beams from the first user terminal, all can operate at the same frequency concurrently without causing interference problems. Software well known in the art runs on the media center 108 and on the user terminal 102 to split network packets into portions that will be sent across a first path comprising the first access point API 104 and the first user beam 110, a second path comprising the second access point AP2 106 and the second user beam 112, and a third path comprising the third access point AP3 806 and the third user beam 812. Since all three access points operate at their full individual data rates, the amount of data received by the user terminal 102 in a given time is effectively tripled.

However, when the first user terminal operates, the second terminal will operate in a different frequency slot, or different time slots, or via other multiplexing schemes. There are no frequency re-use among the two user terminals because of the Omni directional antenna pattern features in the APs.

Figure 10:
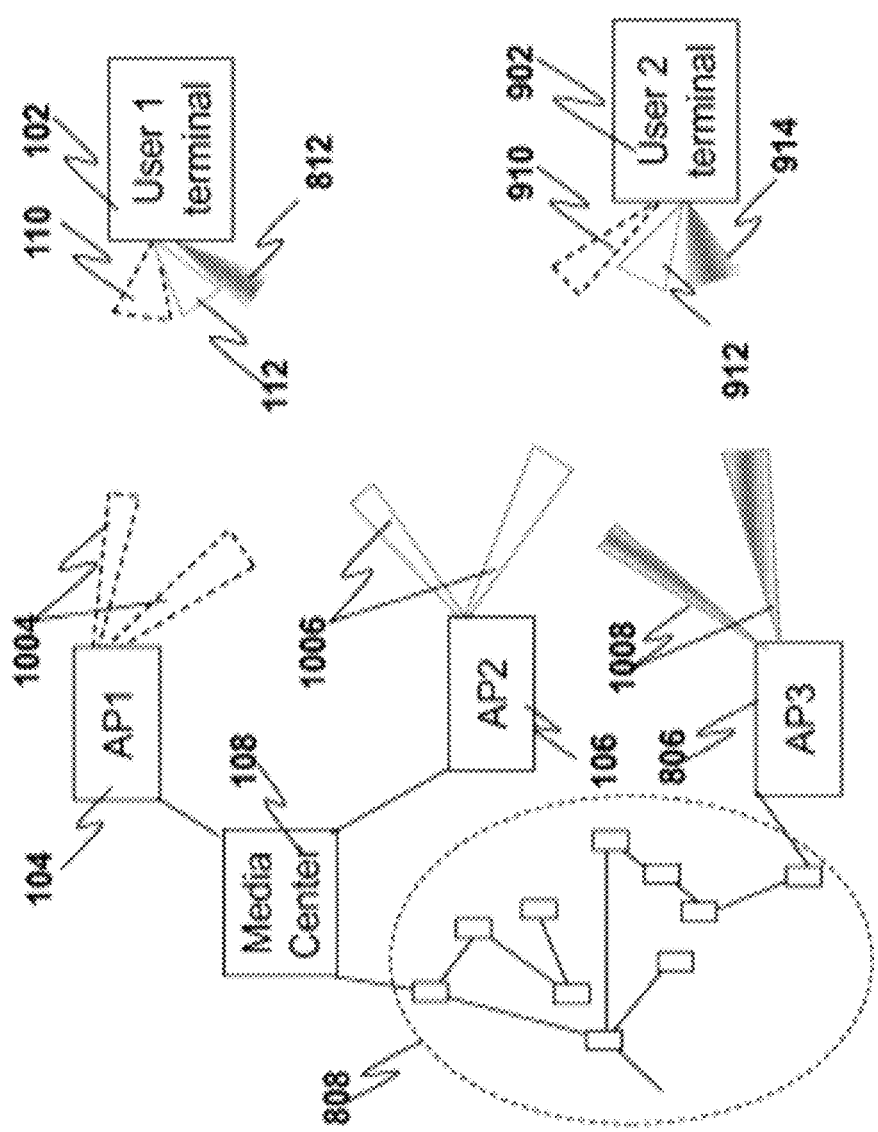
FIG. 10 depicts a media center connected to three spatially-separated wireless access points, and two multi-beam user terminals in accordance with the present invention; All APs feature multiple beams for both transmitting and receiving functions and one of the APs are connected to the media center through IP networks.

FIG. 10 depicts a block diagram of an embodiment of a multiple-beam wireless networking system in accordance with the present invention. A media center 108 stores data that it makes available to a wireless network over three spatially separated wireless access points API 104, AP2 106 and AP3 806. AP3 806 is connected via an IP network 808. All three APs feature multiple concurrent beams. More specifically AP1 104 generates two independent beam patterns 1004, AP2 106 produces two independent beam patterns 1006, and AP3 806 the two beam patterns 1008. This network supports two user terminals 102 and 902. The first user terminal 102 includes a multi-beam antenna capable of pointing three narrow beams 110, 112 and 812 in the directions to the three access points 104, 106 and 806, respectively. The second user terminal 902 includes a multi-beam antenna capable of pointing three narrow beams 910, 912 and 914 in the directions to the three access points 104, 106 and 806, respectively. Both user terminals 102 and 902 include a DBF processor described in more detail below with reference to FIG. 3. The DBF processor allows the construction of three spatially-isolated beams that can be independently steered toward the access points API 104, AP2 106 and AP3 806.

Wireless hubs or routers usually feature digital data buffers. One such a wireless hub or a router can play the roles of the media center 108 in FIG. 9; receiving digital data, buffering the data, and re-transmitting the received or buffered digital data to designated users via IP networks including wireless networks.

Because of the spatial separation achieved by the pointing of the three independent beams from the first user terminal, all can operate at the same frequency concurrently without causing interference problems. Software well known in the art runs on the media center 108 and on the user terminal 102 to split network packets into portions that will be sent across a first path comprising the first access point AP1 104 and the first user beam 110, a second path comprising the second access point AP2 106 and the second user beam 112, and a third path comprising the third access point AP3 806 and the third user beam 812. Since all three access points operate at their full individual data rates, the amount of data received by the user terminal 102 in a given time is effectively tripled.

Similarly, when the first user terminal operates, the second terminal may also operate in a same frequency slot due to angular isolation by the directional antenna pattern features in the APs. In fact, it will be even better to use orthogonal beams (OB) in the APs to provide enhanced isolations among different users. There are two pointing directions for each AP as indicated. The two OB beams generated by an AP will exhibit the following features:

1. A first beam is formed with:
   a. a beam peak toward user 1 terminal 102 and
   b. a deep null toward user 2 terminal 902;
2. A concurrent second beam is formed with:
   a. a beam peak toward user 2 terminal 902 and
   b. a deep null toward user 1 terminal 102.

When each access point with N independent and concurrent beams (e.g. N=2), the three APs, AP1 104, AP2 106, and AP3 806 can support N spatially separated users through the same frequency slot, each user is equipped with an identical terminal 102. Because of the spatial separation among the N users, and directional isolations achieved by the pointing of the N independent beams from the APs and the three concurrent beams for the N users, the 2N links can operate at the same frequency without causing interference problems.

As far as one of the N users is concerned; there are three APs available to triple his/her data rate and throughput. Similarly as far as one of the three APs is concerned, there are N concurrent beams available operating at a common frequency slot to service up to N different users simultaneously.

Of course, more than two users and more than two beams per access point as well as more than two access points are also possible and would fall within the scope and spirit of the present invention.

Herein, the term "multidimensional data structure" is used to denote a set of K-muxed data which results from performing a wavefront multiplexing transform on original data streams. The term "K-muxing" is synonymous with the term "wavefront multiplexing", and the term "K-demuxing" is synonymous with the term "wavefront demultiplexing". The multidimensional data structure has multiple components. For example, a 4-dimensional (4D) data structure is used herein to denote a set of K-muxed data which has 4 components. The 4-component K-muxed data set is a result of performing a 4-to-4 K-muxing transform on original data streams. It is noted that performing a specific K-muxing transform in a K-muxing unit or K-muxing processor on original data streams generates a unique data structure, and that performing different K-muxing transforms usually result in different corresponding data structures. Similarly, performing a specific K-demuxing transform on a set of K-muxed data in a post-processor will recover the original data streams only from a unique corresponding data structure, and that, normally, performing different K-demuxing transforms will result in recovering original data streams only from corresponding data structures. In other words, normally, a K-demuxing transform operating on a set of K-muxed data to recover the original data streams must be an inverse of the K-muxing transform that was used to generate the set of K-muxed data.

Transforms by Hadamard matrix operations will be used to exemplify the K-muxing and K-demuxing operations. There are other implementing techniques for K-muxing/K-demuxing transforms such as those identified in U.S. patent application Ser. No. 14/793684 filed on Jul. 7, 2015, entitled "Data transport privacy and redundancy via small UAVs in cooperation." These techniques comprise digital and analog circuitries in hardware, and embedded software on digital devices such as ASICS, DSPs, and/or FPGAs.

Figure 11:
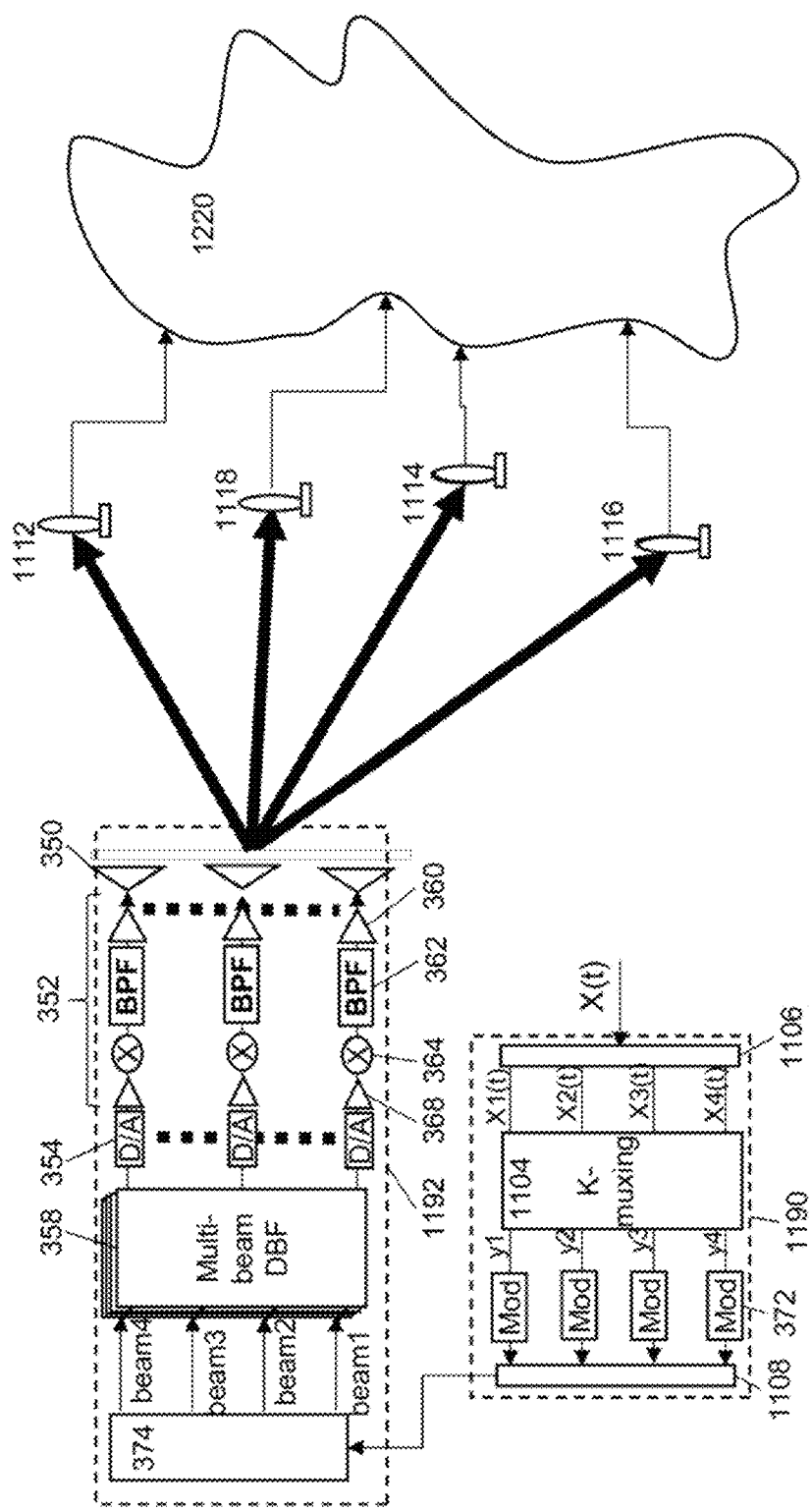
FIG. 11 is a diagram illustrating a user terminal comprising a pre-processor 1190 and a 4-beam transmitting (Tx) multi-beam antenna (MBA) 1192 for transmitting data to four access points 1112, 1114, 1116, 1118 which are in communication with an IP network or cloud 1220, according to one embodiment.

FIG. 11 is a diagram illustrating a user terminal comprising a pre-processor 1190 and a 4-beam transmitting (Tx) multi-beam antenna (MBA) 1192 for transmitting data to four access points 1112, 1114, 1116, 1118 which are in communication with an IP network or cloud 1120, in accordance with one embodiment.

The pre-processor 1190 comprises a segmenting device 1106, a K-muxing unit 1104, a bank of modulators 372 for converting data streams into signal streams, and cache 1108 or an equivalent buffer. and a cache 1108 or an equivalent buffer. Each of the 4 modulators 372 converts a data substream yi to a signal substream $\underline{yi}$, where i=1 to 4. The cache 1108 is coupled to a router 374 included in the 4-beam Tx MBA 1192 to provide the signal substreams $\underline{yi}$, i=1, as inputs to the 4-beam Tx MBA 1192.

A data stream X(t) is to be transported to cloud 1120 or though cloud 1120 to a destination. X(t) may be an audio stream, a video stream, a picture, a document in Microsoft® Office formats, a compressed audio/video file, or a data file in other formats. X(t), in any format, will be converted to a sample-by-sample data stream. X(t) is segmented by the segmenting device 1106 into 4 data substreams X1(t), X2(t), X3(t), and X4(t) which are inputted to 4 input ports of the K-muxing unit 1104. The 4 outputs from the 4-output ports of the K-muxing unit 1104 are the 4 K-muxed data substreams y1, y2, y3, and y4.

The 4-dimensional (4D) data structure generated by the K-muxing unit 1104 with 4 input signals and 4 output signals in this embodiment is used to provide data privacy. The K-muxing unit 1104 may be a K-muxing processor or a K-muxing device. The K-muxing transform utilized by the K-muxing unit 1104 may be implemented as a digital circuit on silicon chip, or customized software embedded on ASIC chip, customized Digital Signal Processor, or FPGA. As an example, a 4 by 4 Hadamard matrix, [H], is used as a K-muxing transform by the K-muxing unit 1104 to generate the 4D data structure. The Hadamard matrix is used in a first method to transform multiple input data streams into a data set with a 4D data structure. A Fourier transform may be used in a second method to transform the same multiple input data streams into a second data set with a different 4D data structure. Any transform by an orthogonal matrix operation may be used as a K-muxing transform by the K-muxing unit 1104 to generate a 4D data structure. Any orthogonal matrix or non-orthogonal matrix with a full rank of 4 may also be used in a third method to transform the same multiple input data streams into a third data set with another different 4D data structure; as long as there exists an inverse of the non-orthogonal matrix. As a result, $$[y] = [H] * [X] \quad (1)$$

where:

$$[y] = [y1 \quad y2 \quad y3 \quad y4]^T$$

$$[X] = [X1 \quad X2 \quad X3 \quad X4]^T$$

$$[H] = \begin{bmatrix} 1 & 1 & 1 & 1 \\ -1 & 1 & -1 & 1 \\ -1 & -1 & 1 & 1 \\ 1 & -1 & -1 & 1 \end{bmatrix}$$

Equation (1) can be rewritten as follows:

$$y1 = X1(t) + X2(t) + X3(t) + X4(t) \quad (1a)$$

$$y2 = X1(t) - X2(t) + X3(t) - X4(t) \quad (1b)$$

$$y3 = X1(t) + X2(t) - X3(t) - X4(t) \quad (1c)$$

$$y4 = X1(t) - X2(t) - X3(t) + X4(t) \quad (1d)$$

The 4-input vector [X] is transformed into the 4-output vector [y] which is considered as a 4D data structure or a 4D vector. Each of the 4 outputs y1, y2, y3, or y4 is a component of the 4D data structure or the 4D vector [y], and is a linear combination of the 4 inputs X1(t), X2(t), X3(t), and X4(t).

The data X(t) is transported in the form of [y] for enhanced data privacy. Experimental results indicate that it is difficult to figure out the values of X1(t), X2(t), X3(t) and/or X4(t) by examining y1, y2, y3, or y4 individually, thus enhanced data privacy is achieved. Each dimension of the 4-dimensional (4D) data structure is transported individually via different paths in the IP network or cloud 1120.

The diagram of the 4-beam Tx MBA 1192 is similar to the diagram depicted in FIG. 4. The 4-beam Tx MBA 1192 comprises a router 374 having 4 output ports. Each of the output ports of the router 374 is connected to one of the four-beam inputs of a set of digital beam forming networks or processors (DBFs) 358. Each of the digital waveforms outputted from the DBFs 358 is converted to an analog waveform by a respective digital-to-analog (D/A) converter 354. The analog waveform is then amplified by an amplifier 368 and frequency up-converted by a frequency up-converter 364 to radio frequency. Note that very high-speed D/As may enable digital-to-analog conversion at radio frequency, in which case, the frequency up-conversion stage may be eliminated. The up-converted signals are then band-pass filtered by band-pass filters 362, amplified by solid-state power amplifiers 360 or similar RF amplifiers, and applied to the antenna elements of the antenna array 350. Thus, the 4-beam Tx MBA 1192 provides a means to send each signal substream, yi, where i=1 to 4, received from the pre-processor 1190, to one of 4 assigned access points (APs) 1112, 1114, 1116, and 1118.

There are at least 4 array elements in the array of antenna elements 350 in the 4-beam Tx MBA 1192. The antenna array may be arranged as linear arrays, planar 2D array or non-planar distributed array. Each of the 4 transmit beams formed by the DBFs 358 may be shaped beams, including orthogonal beams (OBs), fixed beams, agile beams, or combinations of any of the above. The transmit beams include a first transmit beam and a second transmit beam. The first transmit beam is directed at a first access point and the second transmit beam is directed at a second access point. The first access point and the second access points are spatially separated by an angular distance greater than the beam width of the first transmit beam, and the first and second access points operate at substantially the same frequency.

These APs that are communicating with IP networks or cloud 1120 in some embodiments may be hubs for small cells, or base stations of wireless mobile networks in cell phone bands. In other embodiments, the assigned access points (APs) 1112, 1114, 1116, or 1118 are communicating with IP networks or cloud 1120 operating in wireless bands for fixed or slow moving terminals such as WIFI, WiMAX, or Bluetooth. IP networks or cloud 1120 operating in wireless bands for fixed or slow moving terminals such as WIFI or Wi-Fi uses the 2.4 GHz, 3 GHz, 5 GHz, and 60 GHz radio frequency bands to provide access to a local network. Wi-Fi is more popular in end-user devices. Wi-Fi runs on the Media Access Control's CSMA/CA protocol, which is connectionless and contention based, whereas WiMAX runs a connection-oriented MAC. The embodiment shown in FIG. 11 works in any radio frequency (RF) bands, including RF bands near and below 6 GHz, and in millimeter frequency bands. Practically, it provides significant benefits over frequency slots ranging from UHF (<1 GHz) up to submillimeter frequency bands (>100 GHz).

Figure 12:
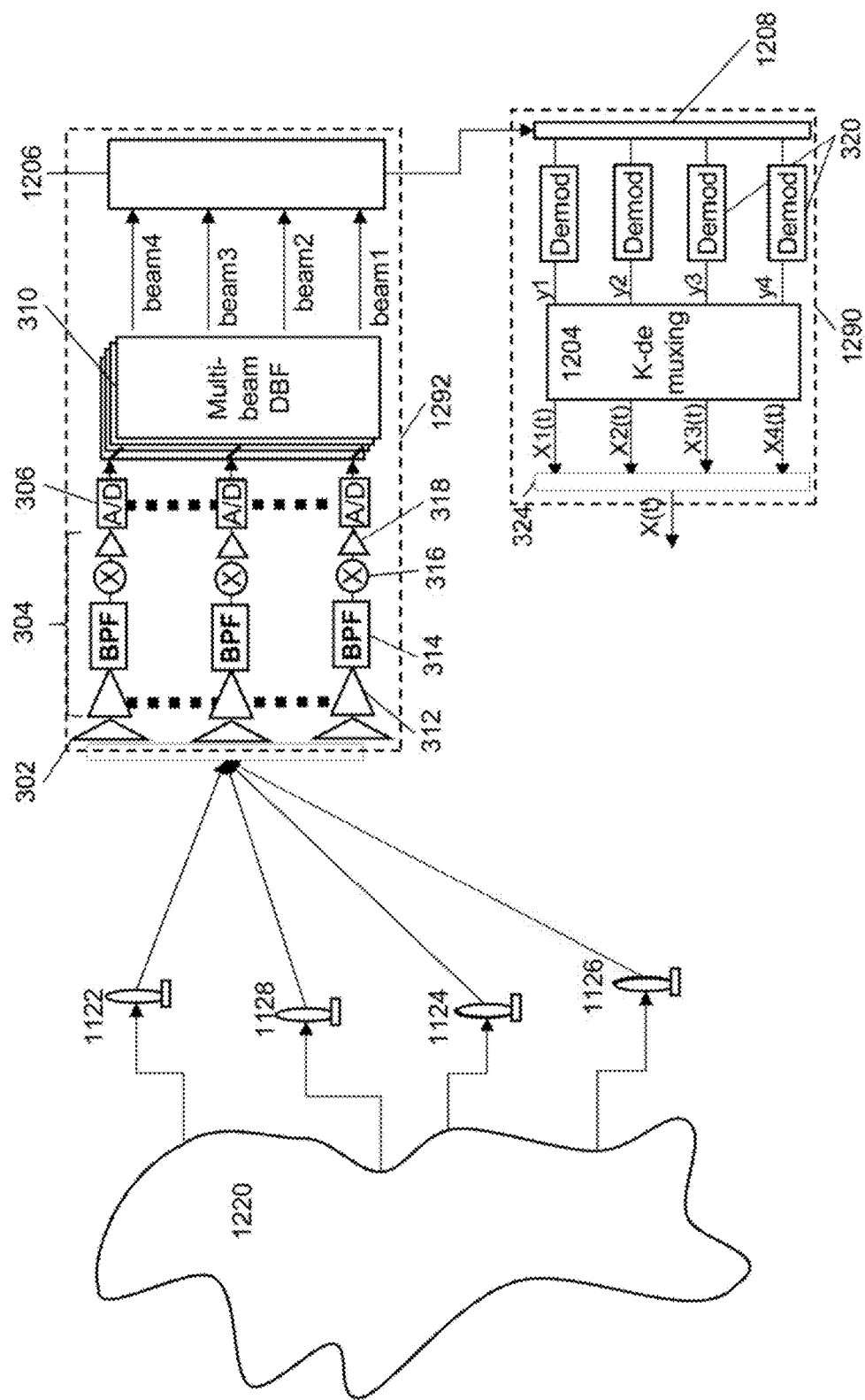
FIG. 12 is a diagram illustrating a user terminal receiving from four access points 1122, 1124, 1126, 1128 the signal streams sent through cloud 1220 from the embodiment shown in FIG. 11, according to one embodiment. The user terminal comprises a 4-beam receiving (Rx) multi-beam antenna (MBA) 1292 for receiving the signal streams from the access points and a post-processor 1290 for recovering the original data stream.

FIG. 12 is a diagram illustrating a user terminal receiving from four access points 1122, 1124, 1126, 1128 the signal streams sent through cloud 1120 from the embodiment shown in FIG. 11, according to one embodiment. The user terminal comprises a 4-beam receiving (Rx) multi-beam antenna (MBA) 1292 for receiving the signal streams from the access points and a post-processor 1290 for recovering the original data stream.

The 4-beam receiving (Rx) MBA is in communication with 4 APs 1122, 1124, 1126, 1128 and receives all 4 intended K-muxed signal substreams (intended for the user terminal) from the 4 APs. The data transported through cloud 1120 and arrived at the 4 APs is in a K-muxed data structure. In other words, the data X(t) during transport is in a 4D vector form [y] for enhanced data privacy. Experimental results indicate that it is difficult to figure out the values of X1(t), X2(t), X3(t) and/or X4(t) by examining y1, y2, y3, or y4 individually, thus enhanced data privacy is achieved. Each dimension (component) of the 4-dimensional (4D) data structure is transported individually. The various components in the 4D data structure are sent via different paths in an IP network or cloud 1120.

The diagram of the 4-beam Rx MBA 1292 is similar to the diagram depicted in FIG. 3. The 4-beam Rx MBA 1292 comprises an array of antenna elements 302 for receiving the signal substreams from the APs 1122, 1124, 1126, 1128; radio-frequency front ends 304; analog-to-digital converters 306; receiving (Rx) digital beam forming networks or processors (DBFs) 310; and a router 1206. Each of the radio-frequency front ends 304 comprises a low-noise amplifier 312, a band-pass filter 314 to limit out-of-band noise, a frequency down-converter 316, and an intermediate-frequency or baseband-frequency amplifier 318. The analog-to-digital converters 306 sample the frequency-down-converted signals and present the samples to the Rx DBFs 310 for processing the received signals. The router 1206 has 4 input ports. Each of the 4 input ports of the router 1206 is connected to one of the four beam outputs of the Rx digital beam forming networks or processors 310, capturing a signal substream, yi, where i=1 to 4, from one of the 4 assigned access points (APs) 1122, 1124, 1126, and 1128. These APs connected to IP networks or cloud 1120 in some embodiments may be hubs for small cells, or base stations of wireless mobile networks in cell phone bands. In other embodiments, the assigned access points (AP) 1122, 1124, 1126, or 1128 connected to IP networks or cloud 1120 operated in wireless bands for fixed or slow moving terminals such as WIFI, WiMAX, or Bluetooth.

There are at least 4 array elements in the array of antenna elements 302 in the 4-beam Rx MBA 1292. The antenna array may be arranged as linear arrays, planar 2D array or non-planar distributed array. Each of the 4 receive beams formed by the DBFs 310 may be shaped beams, including orthogonal beams (OBs), fixed beams, agile beams, or combinations of any of the above. The receive beams include a first receive beam and a second receive beam. The first receive beam is directed at a first access point and the second receive beam is directed at a second access point. The first access point and the second access points are spatially separated by an angular distance greater than the beam width of the first receive beam, and the first and second access points operate at substantially the same frequency.

A post-processor 1290, or a post-processing unit, comprises a cache 1208 or an equivalent buffer, a bank of demodulators 320 for converting signal streams into data streams, a K-demuxing unit 1204, and a de-segmenting or channel bonding device 324. The cache 1208 or an equivalent buffer is coupled to the router 1206 to receive the outputs of the 4-beam receiving (Rx) multiple beam antenna (MBA) 1292. Each of the 4 demodulators 322 converts a signal substream yi to a data substream, $\underline{yi}$, where i=1 to 4. The demodulations for the four beams may be for differently modulated signal streams, that is, signal streams that were modulated with different modulation schemes; a first signal stream may be a QPSK stream, a second one may be a 8-PSK stream, and the remaining ones may be a 16 QAM stream and a 32 QAM stream.

The K-demuxing unit 1204 uses the same 4 by 4 Hadamard matrix [H] as the K-demuxing transform. As a result, $$[X] = [H] * [y]/4 \quad (2)$$

where $$[X] = [X1 \; X2 \; X3 \; X4]^T$$

$$[y] = [y1 \; y2 \; y3 \; y4]^T$$

$$[H] = \begin{bmatrix} 1 & 1 & 1 & 1 \\ -1 & 1 & -1 & 1 \\ -1 & -1 & 1 & 1 \\ 1 & -1 & -1 & 1 \end{bmatrix}$$

Equation (2) can be rewritten as:

$$X1 = [y1(t) + y2(t) + y3(t) + y4(t)]/4 \quad (2a)$$

$$X2 = [y1(t) - y2(t) + y3(t) - y4(t)]/4 \quad (2b)$$

$$X3 = [y1(t) + y2(t) - y3(t) - y4(t)]/4 \quad (2c)$$

$$X4 = [y1(t) - y2(t) - y3(t) + y4(t)]/4 \quad (2d)$$

The 4 inputs (i.e., 4 components) of [y] form a 4D data structure or a 4D vector which is transformed by the 4 by 4 Hadamard matrix [H] into the 4 outputs (i.e., 4 components) of [X]. Each of the 4 outputs $X1(t)$, $X2(t)$, $X3(t)$, or $X4(t)$ is a linear combination of the 4 inputs y1, y2, y3, and y4, which are components of the 4D data structure or the 4D vector [y].

The original data stream X(t) is reconstituted by the 4 recovered data substreams which are the 4 components of [X]. Four segmented data substreams, which are the 4 components of [X], are recovered from the K-demuxing unit 1204 which performs the 4-to-4 K-demuxing transform [H] on the 4 components of [y]. The 4 output ports of the K-demuxing unit 1204 output the 4 components of [X]. The de-segmenting or channel bonding device 324 de-segments the 4 components $X1(t)$, $X2(t)$, $X3(t)$, $X4(t)$ into the recovered X(t). The transported data having a privacy enhanced data structure can be transformed back to the original segmented data substreams only by a K-demuxing transform that is an inverse of the K-muxing transform that was used on the original segmented data substreams to generate the transported data.

Figure 13:
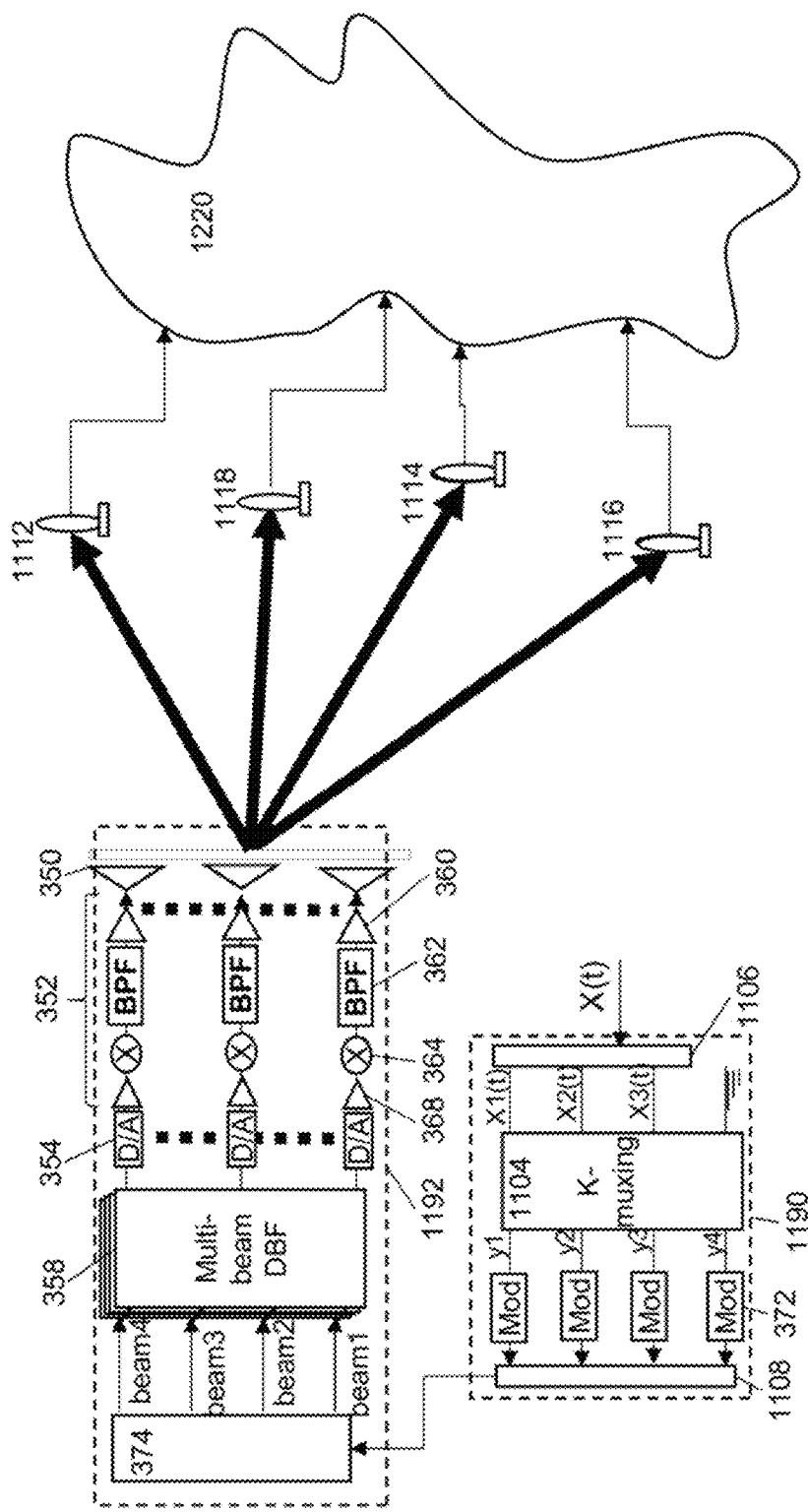
FIG. 13 is a diagram illustrating an embodiment similar to the one shown in FIG. 11, with the difference being that one input port of the K-muxing unit 1104 in the pre-processor 1190 is grounded. A data stream X(t) to be transported is segmented into 3 data substreams which are connected to the remaining 3 input ports of the K-muxing unit 1104. The 4 outputs from the 4 output ports of the K-muxing unit 1104 are the 4 K-muxed data substreams. This embodiment with 3 data inputs and 4 outputs provides data privacy, redundancy, and integrity monitoring capability.

FIG. 13 is a diagram illustrating an embodiment similar to the one shown in FIG. 11, with the only difference being that one input port of the K-muxing unit 1104 in the pre-processor 1190 is grounded. A data stream X(t) to be transported is segmented into 3 data substreams which are connected to the remaining 3 input ports of the K-muxing unit 1104. The 4 outputs from the 4 output ports of the K-muxing unit 1104 are the 4 K-muxed data substreams. This embodiment with 3 data inputs and 4 outputs provides data privacy, redundancy, and integrity monitoring capability.

A data stream X(t) to be transported is segmented by a segmenting device 1106 into 3 data substreams $X1(t)$, $X2(t)$, and $X3(t)$ which are connected to 3 input ports of the K-muxing unit 1104. The $4^{th}$ input port is connected to ground. The 4 outputs from the 4-output ports are the 4 K-muxed data substreams y1, y2, y3, and y4. FIG. 13 depicts a configuration for The 4-beam MBA 1192 in transmitting mode radiates the 4 K-muxed data substreams y1, y2, y3, y4 in the form of 4 signal substreams, $\underline{yi}$, where i=1 to 4, to the 4 APs 1112, 1114, 1116, 1118.

The 4-dimensional (4D) data structure generated by the K-muxing unit 1104 with 3 data inputs and 4 outputs in this example provides data privacy, redundancy, and integrity monitoring capability. The 4 inputs to the K-muxing unit 1104 are 3 data substreams and a stream of "zeros" (from the grounded input port).

In this example, a 4 by 4 Hadamard matrix, [H], is used as the K-muxing transform by the K-muxing unit 1104. As a result, $$[y] = [H] * [X0] \text{ where} \quad (3)$$

$$[y] = [y1 \; y2 \; y3 \; y4]^T$$

$$[X0] = [X1(t) \; X2(t) \; X3(t) \; Z(t)]^T \text{ and}$$

$$Z(t) = 0$$

$$[H] = \begin{bmatrix} 1 & 1 & 1 & 1 \\ -1 & 1 & -1 & 1 \\ -1 & -1 & 1 & 1 \\ 1 & -1 & -1 & 1 \end{bmatrix}$$

Equation (3) can be rewritten as:

$$y1 = X1(t) + X2(t) + X3(t) + Z(t) \quad (3a)$$

$$y2 = X1(t) - X2(t) + X3(t) - Z(t) \quad (3b)$$

$$y3 = X1(t) + X2(t) - X3(t) - Z(t) \quad (3c)$$

$$y4 = X1(t) - X2(t) - X3(t) + Z(t) \quad (3d)$$

$$\text{and } Z(t) = 0 \quad (3e)$$

The 4 inputs, represented by vector [X0], are transformed into the 4 outputs, represented by vector [y] which is considered as a 4D data structure or a 4D vector. Each of the 4 outputs y1, y2, y3, or y4 is a component of the 4D data structure or the 4D vector, and is a linear combination of the 4 inputs, $X1(t)$, $X2(t)$, $X3(t)$, and Z(t). Z(t) is a known a priori data stream between a source and a destination for data transport.

The K-muxing unit 1104 may operate in a sample-by-sample fashion, a $\underline{ms}$-to-$\underline{ms}$, a bit-stream, or other fashions, where "$\underline{ms}$" stands for "multiple sample".

It is noted that, for a sample-by-sample generation for the 4D data structure, there are 3 input data samples (or variables) [X1($t_o$), X2($t_o$), X3($t_o$)] unknown at the destination, and 4 equations for 4 observables to be transported, [y1, y2, y3, y4] at t=$t_o$ sample time. The $4^{th}$ input data sample, Z($t_o$), is known at both the source and destination. Thus, there is a data redundancy for [X] in the 4D data structure.

When any three of the 4 observables, [y1, y2, y3, y4], are received at a destination, the 3 data sampled streams [X1($t$), X2($t$), X3($t$)] for data transport can be fully recovered. Therefore, the data structure provides one redundancy, or more precisely, a 4-for-3 redundancy. This will be further explained in connection with FIG. 14 and FIG. 15 for different applications.

Data X(t) is transported in the form [y] for enhanced data privacy and better availability via data redundancy. Experimental results show that it is difficult to figure out the values of X1($t$), X2($t$), and/or X3($t$) by examining y1, y2, y3, or y4 individually. Each dimension of the 4-dimensional (4D) data structure is transported individually via different paths in an IP network or cloud 1120.

A pre-processor 1190 comprises a segmenting device 1106, the K-muxing unit 1104, a bank of modulators 372 for converting data streams into signal streams, and a cache 1108 or an equivalent buffer, which connects to a router 374 to provide inputs to the 4-beam transmitting (Tx) multiple beam antenna (MBA) 1192. Each of the 4 modulators 372 converts a data substream yi to a signal substream, yi where i=1 to 4.

The functional diagram of the 4-beam Tx MBA 1192 is the same as the one shown in FIG. 11, and is as described previously in connection with FIG. 11. The APs 1112, 1114, 1116, or 1118 connected to IP networks or cloud 1120 in some embodiments may be hubs for small cells, or base stations of wireless mobile networks in cell phone bands. In other embodiments, the assigned access points (AP) 1112, 1114, 1116, or 1118 are connected to IP networks or cloud 1120 operating in wireless bands for fixed or slow moving terminals such as WIFI, WiMAX, or Bluetooth. IP networks or cloud 1120 operating in wireless bands for fixed or slow moving terminals such as WIFI or Wi-Fi use the 2.4 GHz, 3 GHz, 5 GHz, and 60 GHz radio frequency bands to provide access to a local network. Wi-Fi is more popular in end-user devices. Wi-Fi runs on the Media Access Control's CSMA/CA protocol, which is connectionless and contention based, whereas WiMAX runs a connection-oriented MAC. The embodiment shown in FIG.13 works in any radio frequency (RF) bands, including RF bands near and below 6 GHz, and in millimeter frequency bands. Practically, it provides significant benefits over frequency slots ranging from UHF (<1 GHz) up to submillimeter frequency band (>100 GHz).

Figure 14:
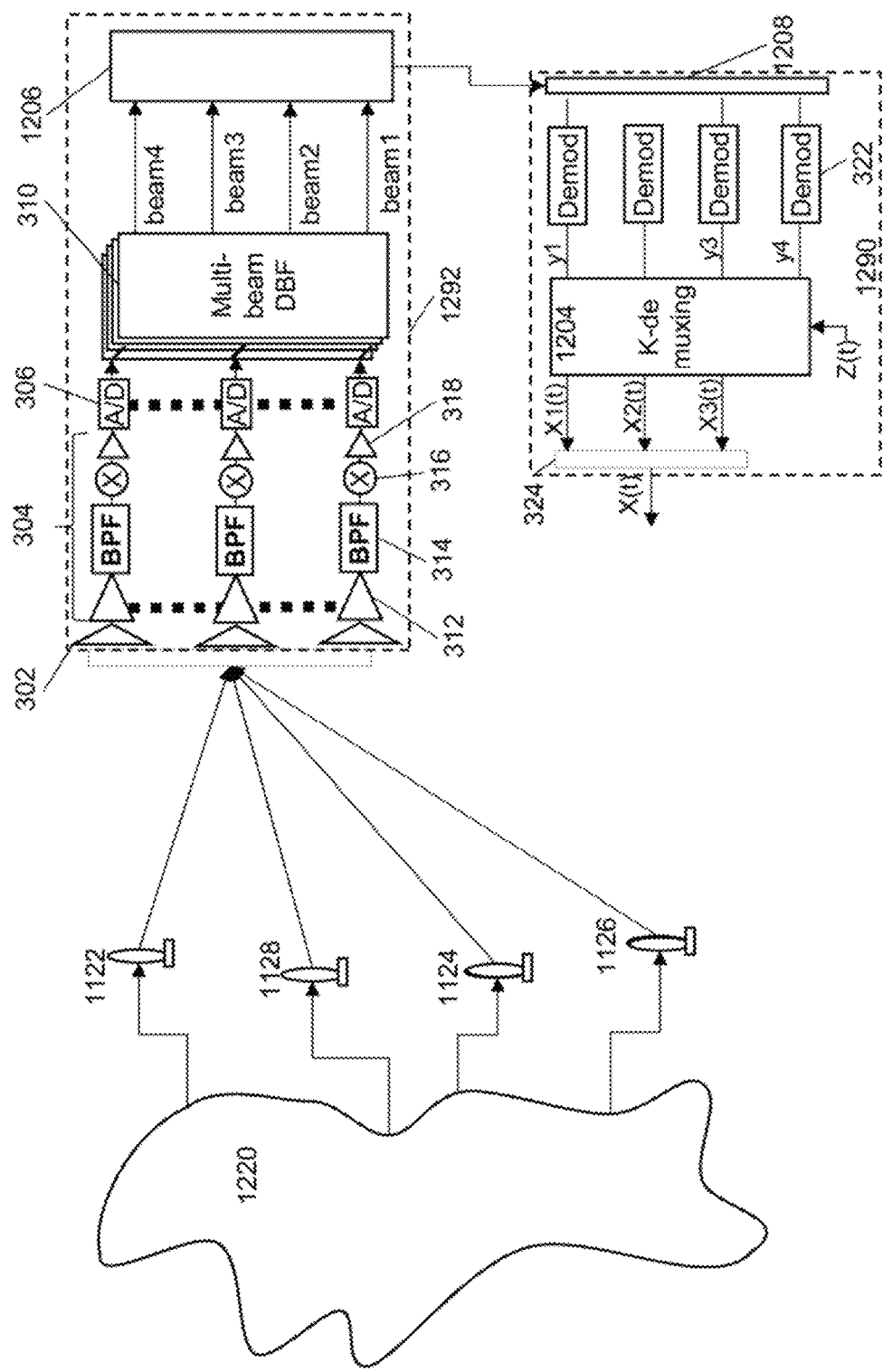
FIG. 14 is a diagram illustrating a user terminal receiving from four access points 1122, 1124, 1126, 1128 the signal streams sent through cloud 1220 from the embodiment shown in FIG. 13, according to one embodiment. The user terminal comprises a 4-beam receiving (Rx) multi-beam antenna (MBA) 1292 for receiving the signal streams from the access points and a post-processor 1290 for recovering the original data stream. In this embodiment, the user terminal receives only 3 out of 4 intended K-muxed signal substreams.

FIG. 14 is a diagram illustrating a user terminal receiving from four access points 1122, 1124, 1126, 1128 the signal streams sent through cloud 1120 from the embodiment shown in FIG. 13, according to one embodiment. The user terminal comprises a 4-beam receiving (Rx) multi-beam antenna (MBA) 1292 for receiving the signal streams from the access points and a post-processor 1290 for recovering the original data stream. In this embodiment, the user terminal receives only 3 out of 4 intended K-muxed signal substreams.

The 4-beam Rx MBA 1292 connecting to 4 APs 1122, 1124, 1126, 1128 receive only 3 out of 4 intended K-muxed signal substreams yi, where i=1 to 4. The data transported through cloud 1120 and arrived at the 4 APs is in a K-muxed data structure. In other words, the data X(t) during transport is in a 4D vector form [y] for enhanced data privacy. It is observed that it is difficult to figure out the values of X1($t$), X2($t$), X3($t$) by examining y1, y2, y3, or y4 individually. Each dimension of the 4-dimensional (4D) data structure is transported individually. Various components in the 4D data structure are sent via different paths in an IP network or cloud 1120.

In addition, since the embodiment shown in FIG. 13 provides a K-muxed data structure with better data availability via redundancy to the data transport through cloud 1120 by the 4 APs, the original data stream X(t) can still be reconstituted by the post-processor 1290 when only 3 out of 4 intended K-muxed signal substreams yi, where i=1 to 4, are received by the 4-beam Rx MBA 1292. In other words, the K-demuxing unit 1204 can recover the original data substreams X1($t$), X2($t$), X3($t$) from only 3 out of 4 intended K-muxed data substreams yi, where i=1 to 4.

The functional diagram of the 4-beam Rx MBA 1292 is the same as the one shown in FIG. 12, and is as described previously in connection with FIG. 12. The 4-beam Rx MBA 1292 captures a yi where i=1 to 4, from one the 4 assigned access points (APs) 1122, 1124, 1126, and 1128. These APs connected to IP networks or cloud 1120 in some embodiments may be hubs for small cells, or base stations of wireless mobile networks in cell phone bands. In other embodiments, the assigned access points (AP) 1122, 1124, 1126, or 1128 connected to IP networks or cloud 1120 operate in wireless bands for fixed or slow moving terminals such as WIFI, WiMAX, or Bluetooth.

A post-processor 1290 comprises a cache 1208 or an equivalent buffer, a bank of demodulators 322 for converting signal streams into data streams, a K-demuxing unit 1204, and a de-segmenting or channel bonding device 324. The cache 1208 or an equivalent buffer is coupled to a router 1206 to receive outputs from a 4-beam receiving (Rx) multiple beam antenna (MBA) 1292. Each of the 4 demodulators 322 converts a signal substream yi to a data substream, yi, where i=1 to 4. The demodulations for the four beams may be for different modulated signal streams; a first one may be a QPSK stream, a second one may be a 8-PSK, and the others may be a 16 QAM stream and a 32 QAM stream. In this example, since only 3 K-muxed signal substreams yi, where i=1, 3, 4, are captured, there are only 3 K-muxed data substreams y1, y3, y4.

Let us exemplify the 4D data structure with redundancy. As shown in FIG. 14, y2 is not available. Equations (3a), (3c), and (3d) can be rewritten as follows:

$$y1 = X1(t) + X2(t) + X3(t) + Z(t) \quad (3a')$$

$$y3 = X1(t) + X2(t) - X3(t) - Z(t) \quad (3c')$$

$$y4 = X1(t) - X2(t) - X3(t) + Z(t) \quad (3d')$$

X1($t$), X2($t$), and X3($t$) can be determined using the following equations:

$$X1(t) = [y1 + y4]/2 - Z(t) \quad (4a)$$

$$X2(t) = [y3 - y4]/2 + Z(t) \quad (4b)$$

$$X3(t) = [y1 - y3]/2 - Z(t) \quad (4c)$$

It is clear that, when Z(t) is known a priori at a desired receiver at the destination, the original 3 data substreams X1($t$), X2($t$) and X3($t$) in the vector [X0] can be fully recovered when y2 is missing. In fact, the original 3 data substreams X1($t$), X2($t$) and X3($t$) can be fully recovered when any 3 components of the [y] are available.

In a special case, when Z(t)=0 is inserted, equations (4a), (4b), and (4c) become:

$$X1(t)=[y1+y4]/2 \tag{5a}$$

$$X2(t)=[y3-y4]/2 \tag{5b}$$

$$X3(t)=[y1-y3]/2 \tag{5c}$$

The original data stream, X(t) is reconstituted by the 3 recovered data substreams, $X1(t)$, $X2(t)$, and $X3(t)$, i.e., the first three components of [X0]. Three segmented data substreams, the 3 components of [X0], are recovered from the 4-to-4 K-demuxing unit 1204 with any 3 components of [y]. The data in transport with a privacy and availability enhanced data structure can be transformed back to the original segmented data substreams only by a K-demuxing transform that is an inverse of the K-muxing transform that was used on the original segmented data substreams to generate the transported data.

In other embodiments, the $4^{th}$ component of [X0] is Z(t), which may be used as an access identifier for transported data discrimination. The better available or even more private transmissions can be implemented via this configuration. When even more private data transport is desired, only 3 of the 4 components of [y] will be sent to the cloud. The 3 out of 4 components may be selected as [1, 2, 3], [1, 2, 4], [1, 3, 4] or [2, 3, 4]. New selections may be chosen aperiodically. According to equations (4a), (4b), and (4c), it will be difficult to determine the first three components of [X0] without any information on Z(t). Only those receivers with a priori knowledge of Z(t) can recover the first three components of [X0].

It is possible to configure the operations of data transport between a better availability for transported data and a better enhanced privacy in transported data using the same data structure. The configuration is altered only by switching between (1) sending 3 of the 4 components and (2) sending all 4 components to cloud 1120.

There are techniques of sending updated Z(t) through this operation technique of alternating configuration via a same data structure.

Figure 15:
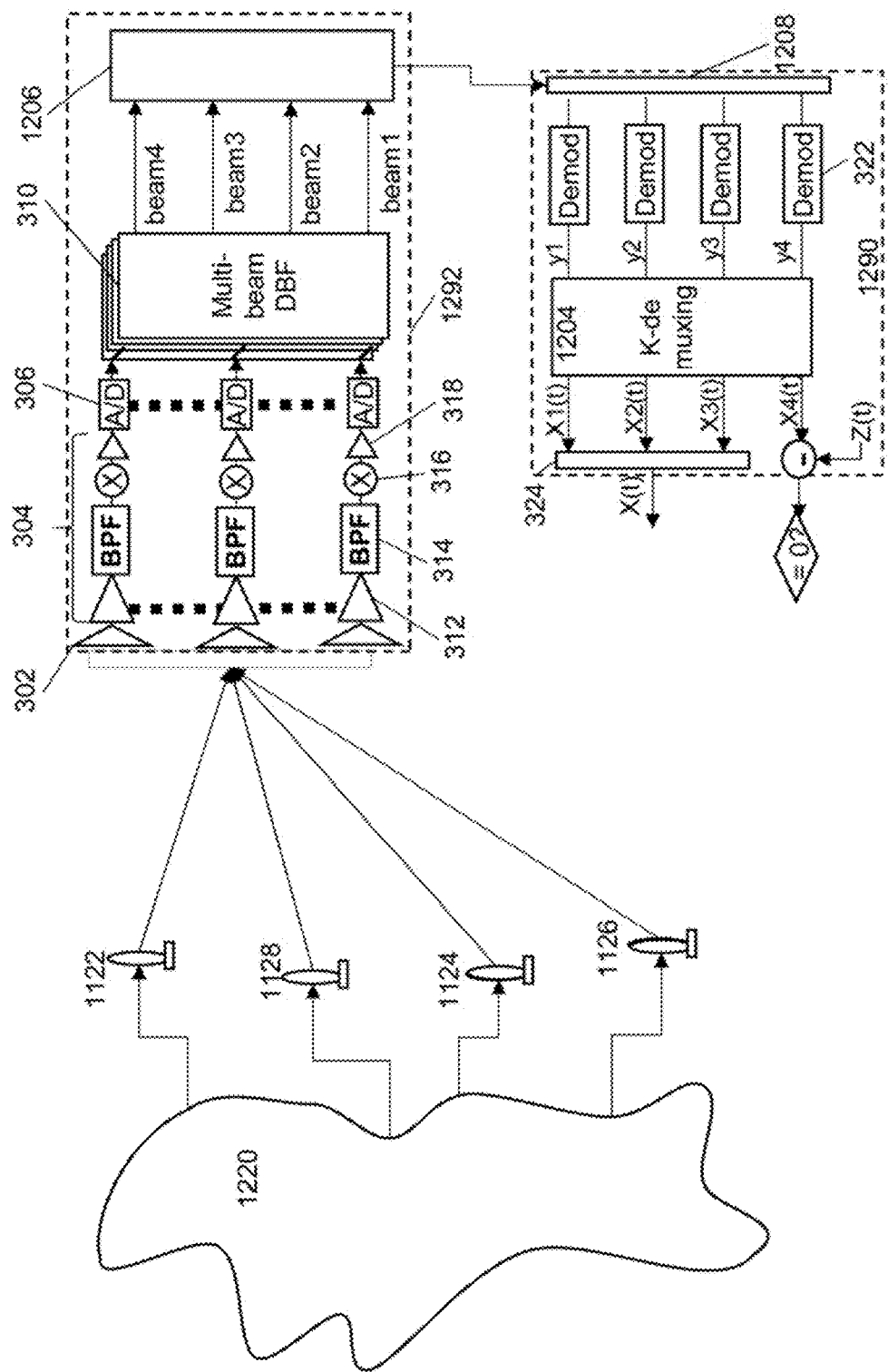
FIG. 15 is a diagram illustrating a user terminal comprising a 4-beam multi-beam antenna receiving from 4 access points all 4 intended K-muxed data substreams, in accordance with one embodiment. The data transport through cloud by 4 APs with a K-muxed data structure provides data integrity monitoring capability.

FIG. 15 is a diagram illustrating a user terminal comprising a 4-beam multi-beam antenna receiving from 4 access points all 4 intended K-muxed data substreams, in accordance with one embodiment. The data transport through cloud by 4 APs with a K-muxed data structure provides data integrity monitoring capability. The data transport through cloud by 4 APs with a K-muxed data structure features data integrity monitoring capability without accessing transported data or the first three components of [X0] of equation (3).

The 4-beam Rx MBA 1292 is identical to the one depicted in FIG. 12 and FIG. 14, and has been described previously in the description of FIG. 12 and FIG. 14.

A post-processor 1290 comprises a cache 1208 or an equivalent buffer, a bank of demodulators 320 converting signal streams into data streams, the K-demuxing unit 1204, and the de-segmenting or channel bonding device 324. The cache 1208 or an equivalent buffer connects to a router 1206 associated to outputs of a 4-beam receiving (Rx) multiple beam antenna (MBA) 1292. Each of the 4 demodulators 320 converts a signal substream yi to a data substream, yi, where i=1 to 4. The demodulations for the four beams may be for different modulated signal streams; a first one may be a QPSK stream, a second one a 8-PSK, and the others may be a 16 QAM stream and a 32 QAM stream.

FIG. 15 illustrates a user terminal comprising an Rx 4-beam MBA 1292 receiving from four access points 1122, 1124, 1126, 1128 the signal streams sent through cloud 1120 from the embodiment shown in FIG. 13. The data transported through cloud and arrived at the 4 APs is in a K-muxed data structure. In other words, the data X(t) during transport is in a 4D vector form [y] for enhanced data privacy. It is observed that it is difficult to figure out the values of $X1(t)$, $X2(t)$, $X3(t)$ and/or $X4(t)$ by examining y1, y2, y3, or y4 individually. Each dimension of the 4-dimensional (4D) data structure is transported individually. Various components in the 4D data structure are sent via different paths in an IP network or cloud 1120.

In addition, the data transport through cloud by 4 APs with a K-muxed data structure features an integrity monitoring capability for transported data via redundancy without accessing the transported data. Z(t) in Equation (3) is a probing data sequence and may or may not be "zero" sequence. As an example, it may be a digital data stream representing an image of a classical Chinese painting in a bit-stream format. In other examples, Z(t) may be a digital data stream representing an audio recording in a bit-stream format from a commercially available CD, or an aggregated selected sections from an online digital dictionary in a word format. All this formats must be converted to a format of sample-to-sample data streams. A sample may be defined as a byte, 8 bytes, 12 bits, 100 bits, or others for a K-muxing transform. The operation in a corresponding K-demuxing unit shall have the same definitions for samples.

$$[y]=[H]*[X0] \tag{6}$$

where $[y]=[y1\ y2\ y3\ y4]^T$
$[X0]=[X1(t)\ X2(t)\ X3(t)\ Z(t)]^T$ and Z(t) is a probing data stream, $$[H] = \begin{bmatrix} 1 & 1 & 1 & 1 \\ -1 & 1 & -1 & 1 \\ -1 & -1 & 1 & 1 \\ 1 & -1 & -1 & 1 \end{bmatrix}$$

The probing data stream Z(t) is known a priori. In a scenario where a monitoring receiver in a destination is authorized to recover the probing data stream but not the transported data substreams of $X1(t)$, $X2(t)$, and $X3(t)$. The monitoring receiver will recover all four components of [y], and will then reconstitute $X4(t)$ via equation (2d) as following:

$$X4(t)=[y1(t)-y2(t)-y3(t)+y4(t)]/4 \tag{2d}$$

The calculated $X4(t)$ above will be compared to the probing data stream Z(t) sample by sample or bit by bit. Only when the differences are a stream of "zeros", the concurrently transported data substreams of $X1(t)$, $X2(t)$, and $X3(t)$ are "verified" or "validated".

On the other hand, a subscriber receiver at the same destination may only be authorized to recover the transported data substreams of $X1(t)$, $X2(t)$, and $X3(t)$ but not the probing data stream. The subscriber receiver will be configured to receive all the 4 components and then to recover $X1(t)$, $X2(t)$, and $X3(t)$ via equations (2a), (2b), and (2c) as follows:

$$X1(t)=[y1(t)+y2(t)+y3(t)+y4(t)]/4 \tag{2a}$$

$$X2(t)=[y1(t)-y2(t)+y3(t)-y4(t)]/4 \tag{2b}$$

$$X3(t)=[y1(t)+y2(t)-y3(t)-y4(t)]/4 \tag{2c}$$

X(t) will be then be reconstituted via a channel bonding device 324 of 3 channels featuring $X1(t)$, $X2(t)$, and $X3(t)$ data substreams, respectively.

On the other hand, the original data stream X(t) can still be reconstituted by a second subscriber terminal in a same destination via any 3 recovered K-muxed data substreams and the known probing data stream by the K-demuxing unit 1204 in a post processor of the second subscriber terminal.

Figure 16:
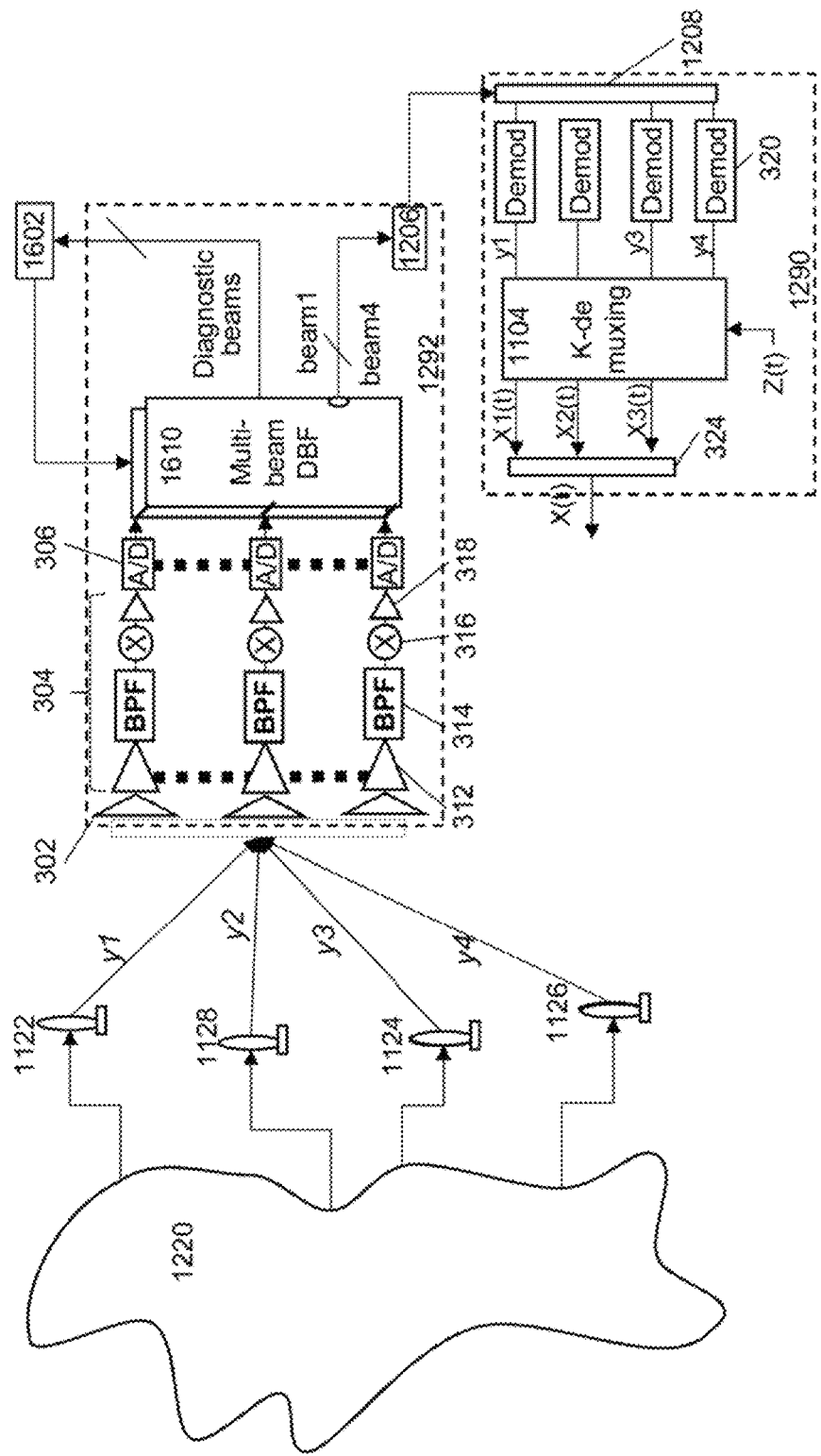
FIG. 16 is a diagram illustrating a user terminal comprising a smart multi-beam antenna including multi-beam digital beam forming networks that form diagnostic beams and service beams concurrently, in accordance with one embodiment. The diagnostic beams comprise agile beams hopping over all possible beam positions. As shown, a beam controller determined that there are 4 beam positons; each highly likely covering an individual access point (AP).

FIG. 16 depicts a configuration for smart MBA with diagnostic beams and service beams concurrently formed by a multi-beam DBF network 1610. The diagnostic beams comprise agile beams hopping over all possible beam positions. As shown, a beam controller 1602 determined that there are 4 beam positions; each highly likely covering an individual access point (AP). It is modified from FIG. 14 by adding functions of diagnostic beams in a multibeam DBF network 1610. In the following, functions of the multibeam DBF network 1610 will be described. The functions in the Rx multibeam antenna 1292 and the functions in the post processor 1290 have been described previously in connection with the embodiment shown in FIG. 14.

One of the advantages of digital beam forming (DBF) networks is the capability of dynamically forming multiple beams. All the DBF networks depicted in FIG. 11, FIG. 12, FIG. 13, FIG. 14, and FIG. 15 have a capability of determining where and how to point the shaped beams generated by the DBF networks.

The following description will exemplify how to use diagnostic beams to find directions of desired APs, assuming that the APs perform both transmit and receiving functions. The following assumptions are made:
1. Bn is the number of available diagnostic beams; and Bn=3. The three beams are assigned by a multiple-beam antenna.
2. The total number of preprogrammed beam positions within a field-of-view (FOV) of the multiple beam antenna is denoted by N; and N=100.
3. A frame time=20 milliseconds.
4. A diagnostic cycle for the multibeam may be set as 1 second which comprises 50 frames.

During a cycle, the controller 1602 will collect data related to performance observables such as measured power levels from various diagnostic beams. It will also convert the observables to measurables by ranking the performance observables, such as:
Assigning a value of 5 to a beam position where the highest received power level is detected by a diagnostic beam.
Assigning values of 4, 3, and 2 to various beam positions where the $2^{nd}$, $3^{rd}$, and $4^{th}$ highest received power levels are measured, respectively.
Assigning a numerical value of "0" to remaining beam positions.

During the first frame time F1 of a cycle; the 3 diagnostic beams will do the following concurrently:
a. A first diagnostic beam will hop around the N positions and determine Np most likely positons with signals by ranking received power levels; Np=20. The dwell time per beam position is 200 microseconds.
b. A second diagnostic beam will hop around the N positions following N1, N3, . . . , N99, N100, N98, . . . , N4, N2 and determine Np most likely positions with signals by ranking received power levels; Np=20. The dwell time per beam position is 200 microseconds.
c. A third diagnostic beam will hop around the N position following N100, N98, . . . , N2, N1, N3, . . . , N97, N99 and determine Np most likely positions with signals by ranking received power levels; Np=20. The dwell time per beam position is 200 microseconds.

During each frame time from F2 to F50:
1. The first diagnostic beam will continue hopping around the N positions and determine Np most likely positions with signals by ranking received power levels; Np=20. The dwell time per beam position is 200 microseconds.
2. The second diagnostic beam will hop around the Np positions following Np1, Np3, . . . , Np19, Np20, Np18, Np4, Np2 and determine 4 most likely positions with signals by ranking received demodulated power levels; and
3. The third diagnostic beam will hop around the N positions following N100, N98, . . . , N2, N1, N3, . . . , N97, N99 and determine Np most likely positons with signals by ranking received demodulated power levels; Np=20.
4. The dwell time per beam position is 200 microseconds for the first diagnostic beam, and 1 millisecond for the $2^{nd}$ and $3^{rd}$ diagnostic beams.

There are two beams (second and third beams) and 49 frames collecting a total of 98 independent sets of "measurables". Each independent set shall have a numerical score of 14 for all the measurables (5, 4, 3, 2, and 0s) over the Np beam positions through the inner loop ranking process above or simply "inner loop ranking".

We shall sum up the 98 independent measurables (assigned numerical values via ranking) as a total measured value for each of the N beam positions. The total measured value shall range from 0 to 490(=5×98, the maximum value possible). We will pick 4 beam positions with the first 4 highest total measured values as our candidates for the 4 likely AP locations.

Similarly there are 52 independent sets of "measurables" to determine Np possible beam positions from the total N beam positons; 50 sets by the first diagnostic beam, one set by the second diagnostic beam, and another set by the third diagnostic beam. This is called outer loop ranking. These sets of the outer loop ranking data will provide a dynamic basis for updating the Np values and the cycle duration.

In a highly dynamic operational environment, the diagnostic cycles shall be kept running continuously. On the other hand, in slow moving dynamical situations, the diagnostic cycles shall be turned on once every few minutes. In a near static situation, the diagnostic cycles shall be turned on hourly or daily.

Figure 17:
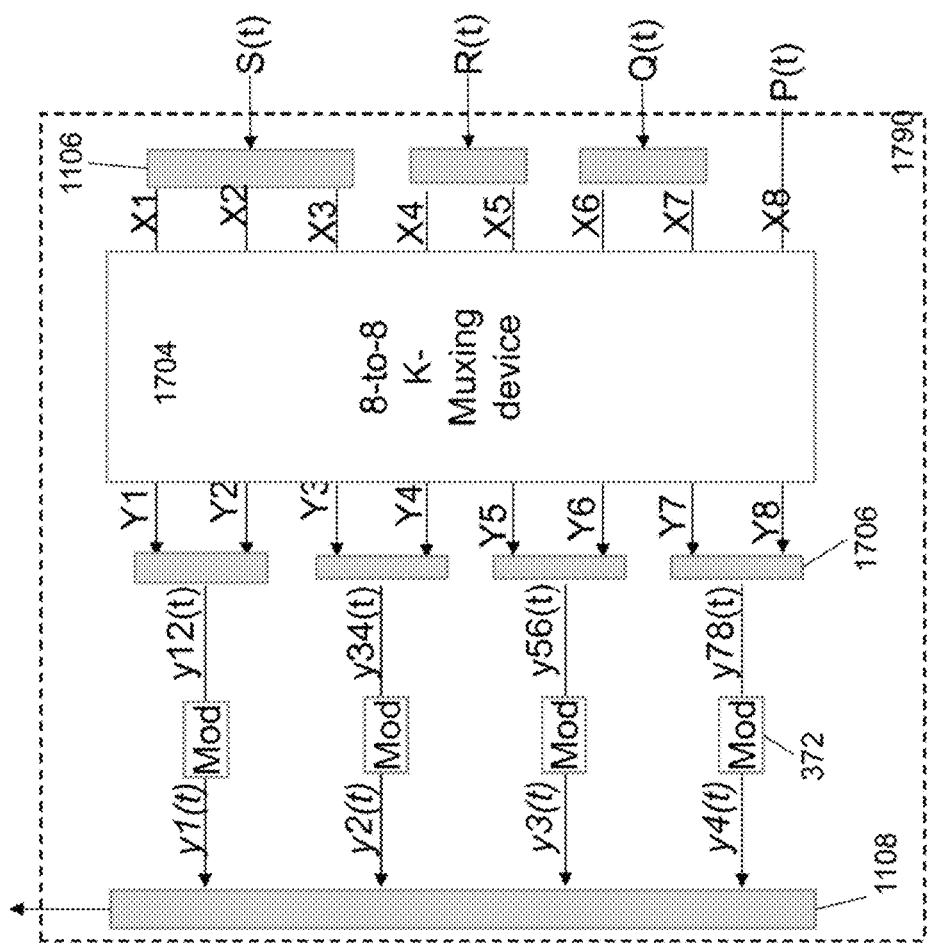
FIG. 17 is a diagram illustrating a preprocessor at a source with a N-to-N K-muxing unit converting M sets of data streams to a N-dimensional data structure to be transported to a destination via R parallel channels in accordance with one embodiment, where M, N and R are strictly positive integers.

FIG. 17 depicts an exemplified implementation replacing a pre-processor 1190 in FIG. 13 or that in FIG. 11 with a pre-processor 1790. An example in which the pre-processor 1190 in FIG. 13 is replaced by the pre-processor 1790 will be described. It is to show (1) how to map 4 separated data streams into a common 8-dimensional (8D) data structure, and (2) how to transport an 8D data structure to cloud 1120 through a 4 beam antenna 1192.

The pre-processor 1790 uses an 8-to-8 K-muxing device 1704 to transform input data streams into an 8D data structure [y], where [y]=[y1(t), y2(t), y3(t), y4(t), y5(t), y6(t), y7(t), y8(t)]. The components of [y] (not indicated in FIG. 17) are the outputs from the 8 output ports indicated as Y1, Y2, Y3, Y4, Y5, Y6, Y7, and Y8.

Assume that an 8-to-8 Hadamard matrix is used for the data transform sample-by-sample. The 8 input ports are indicated as X1, X2, X3, X4, X5, X6, X7, and X8. There are total 4 input data streams to the 8-to-8 K-muxing device 1704:
a first data stream S(t) connected to the first 3 input ports X1, X2, X3 via a segmenting device 1106 or a router;

a second data stream R(t) connected to 2 input ports, X4 and X5, via a second segmenting device 1106 or a router;

a third data stream Q(t) connected to 2 input ports, X6 and X7, via a third segmenting device 1106 or a router; and a fourth data stream P(t) connected to the last input port X8.

P(t) may be a known priori data stream for purposes of channel validation, data integrity monitoring, more privacy protections; and other services.

Signals from the 8 output ports [Y1, Y2, Y3, Y4, Y5, Y6, Y7, Y8] are grouped into 4 groups by a bank of 4 multiplexers 1706. The output data streams from the 4 multiplexers 1706 are y12(t), y34(t), y56(t), and y78(t); these muxed data streams are then modulated and converted into signal streams y1(t), y2(t), y3(t) and y4(t) before being sent to the cache 1108 which are connected to a 4 beam Tx antenna 1192.

Using similar techniques, commercially available 1024 to 1024 or 4096 to 4096 FFT chips may be used to perform K-muxing or K-demuxing transforms. At a source, Nn input data streams are transformed via a FFT chip into a 1024-dimensional (1024D) or a 4096-dimensional (4096D) data structure. This data in the 1024D or a 4096D data structure is transported to a destination using Nc concurrent transport channels. We may set Nn=3 and Nc=4.

At the destination, this data in the 1024D or a 4096D data structure captured by a 4 channel receiver is reformatted first into a regular 1024D or a 4096D data structure with 1024 or 4096 muxed data substreams. The multidimensional data stream is transformed via a second FFT chip back into recovered 1024 or a 4096D data substreams. These data substreams are then group into 3 groups accordingly. The substreams in each group are channel bonded into a reconstituted or transported data stream, which is an identical copy of the corresponding original data stream at the source.

Figure 18:
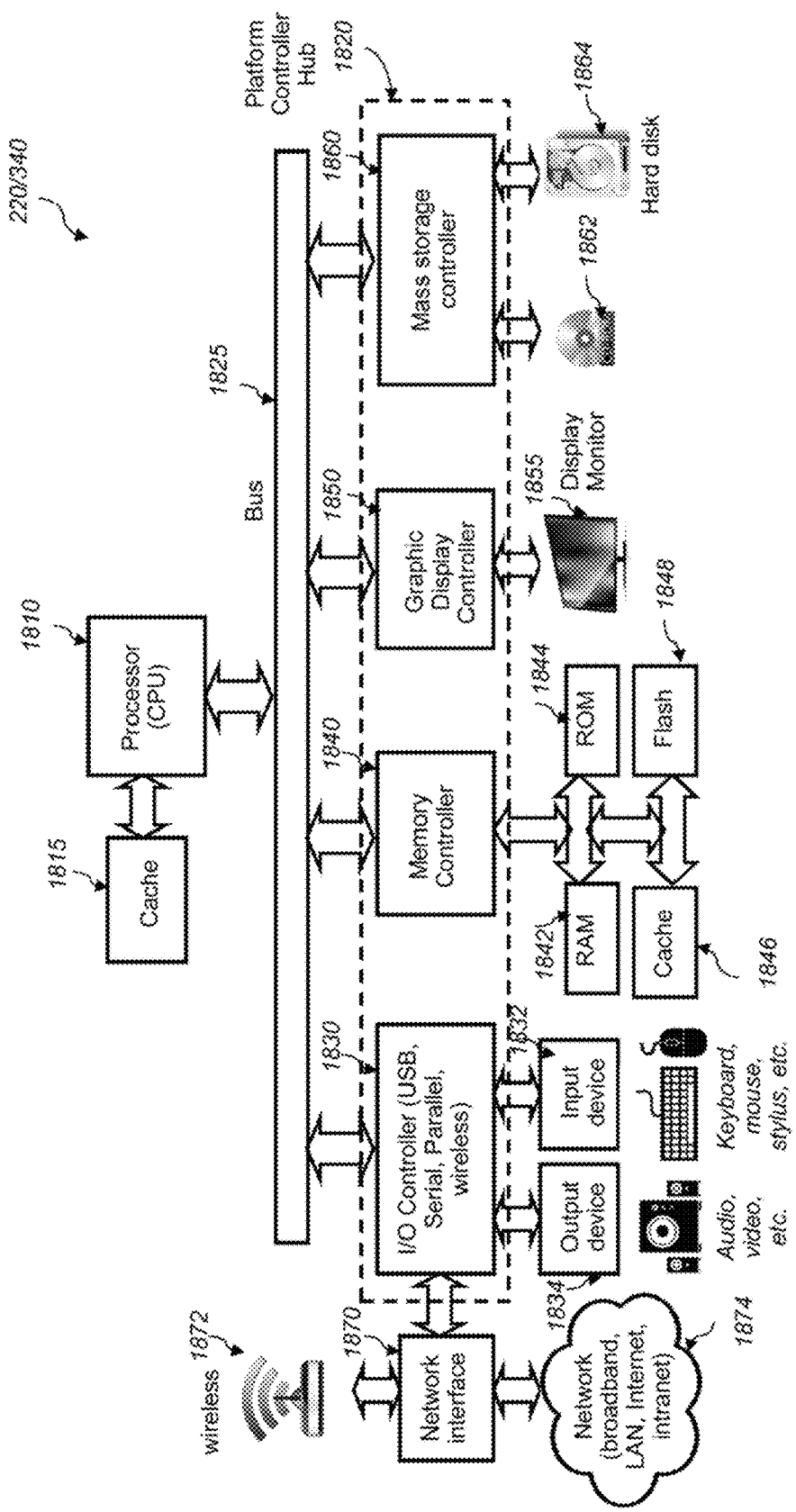
FIG. 18 is a diagram illustrating a processing unit 1190 or 1290 or 1790 according to one embodiment.

FIG. 18 is a diagram illustrating a processing unit 1190 or 1290 or 1790 according to one embodiment. The processing unit 1190/1290/1790 includes a central processing unit (CPU) or a processor 1810, a cache 1815, a platform controller hub (PCH) 1820, a bus 1825. The PCH 1820 may include an input/output (I/O) controller 1830, a memory controller 1840, a graphic display controller (GDC) 1850, and a mass storage controller 1860. The processing unit 1190/1290/1790 may include more or less than the above components. In addition, a component may be integrated into another component. As shown in FIG. 18, all the controllers 1830, 1840, 1850, and 1860 are integrated in the PCH 1820. The integration may be partial and/or overlapped. For example, the GDC 1850 may be integrated into the CPU 1810, the I/O controller 1830 and the memory controller 1840 may be integrated into one single controller, etc.

The CPU or processor 1810 is a programmable device that may execute a program or a collection of instructions to carry out a task. It may be a general-purpose processor, a digital signal processor, a microcontroller, or a specially designed processor such as one design from Applications Specific Integrated Circuit (ASIC). It may include a single core or multiple cores. Each core may have multi-way multi-threading. The CPU 1810 may have simultaneous multithreading feature to further exploit the parallelism due to multiple threads across the multiple cores. In addition, the CPU 1810 may have internal caches at multiple levels.

The cache 1815 is a first level (L1) external cache memory. It is typically implemented by fast static random access memory (RAM). Other cache levels may appear externally, such as the cache 1846. Some or all cache levels (L1, L2, and L3) may all be integrated inside the CPU 1810.

The bus 1820 may be any suitable bus connecting the CPU 1810 to other devices, including the PCH 1820. For example, the bus 1820 may be a Direct Media Interface (DMI).

The PCH 1820 in a highly integrated chipset that includes many functionalities to provide interface to several devices such as memory devices, input/output devices, storage devices, network devices, etc.

The I/O controller 1830 controls input devices (e.g., stylus, keyboard, and mouse, microphone, image sensor) and output devices (e.g., audio devices, speaker, scanner, printer). It also has interface to a network interface card 1870 which provides interface to a network 1874 and wireless controller 1872. The network interface card (NIC) 1870 transmits and receives the data packets to and from a wired, wireless network 1872 or 1874. The NIC 1870 may have one or more sockets for network cables and the type of socket depends on the type of network it will be used in. The network 1874 may be a LAN, a MAN, a WAN, an intranet, an extranet, or the Internet.

The memory controller 1840 controls memory devices such as the random access memory (RAM) 1842, the read-only memory (ROM) 1844, the cache memory 1846, and the flash memory 1848. The RAM 1842 may store instructions or programs, loaded from a mass storage device, that, when executed by the CPU 1810, cause the CPU 1810 to perform operations as described above, such as WFM operations. It may also store data used in the operations, including the input data stream or the output data stream. The ROM 1844 may include instructions, programs, constants, or data that are maintained whether it is powered or not. This may include the matrix coefficients used in the envelope or de-envelope process, a catalog of the envelopes, boot program, self-test programs, etc. The cache memory 1846 may store cache data at level L2 or L3. The cache memory 1846 is typically implemented by fast static RAM to allow fast access from the CPU 1810. The flash memory 1848 may store programs, instructions, constants, tables, coefficients, envelopes as in the ROM 1844. It may be erased and programmed as necessary.

The GDC 1850 controls the display monitor 1855 and provides graphical operations. It may be integrated inside the CPU 1810. It typically has a graphical user interface (GUI) to allow interactions with a user who may send a command or activate a function.

The mass storage controller 1860 controls the mass storage devices such as CD-ROM 1862 and hard disk 1864.

Additional devices or bus interfaces may be available for interconnections and/or expansion. Some examples may include the Peripheral Component Interconnect Express (PCIe) bus, the Universal Serial Bus (USB), etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A user terminal for transmitting data to a plurality of access points, comprising:
 a pre-processor to pre-process at least one source data stream, the pre-processor comprising:
  a segmenting device to segment the at least one source data stream into a set of N data substreams, N being an integer greater than 1;
  a K-muxing unit to perform a N-to-N K-muxing transform on the N data substreams to generate N K-muxed data streams, each of the N K-muxed data streams being a linear combination of the N data substreams; and
  a bank of modulators to modulate the N K-muxed data streams to generate N K-muxed signal streams; and
 a multi-beam antenna coupled to the pre-processor, the multi-beam antenna comprising:
  beam forming networks to transform the N K-muxed signal streams into transmit beams; and
  an array of antenna elements to transmit the transmit beams to the access points.

2. The user terminal of claim 1, wherein the transmit beams include a first transmit beam having a first beam width and a second transmit beam, the first transmit beam being directed at a first of the access points and the second transmit beam being directed at a second of the access points.

3. The user terminal of claim 2, wherein the first and second of the access points are spatially separated by an angular distance greater than the first beam width, and wherein the first and second of the access points operate at substantially same frequency.

4. The user terminal of claim 1, wherein the access points receive the transmit beams and transmit data contained in the transmit beams to cloud or through cloud to a destination.

5. The user terminal of claim 1, wherein the array of antenna elements is configured as a linear array or a planar two-dimensional array or a non-planar distributed array.

6. The user terminal of claim 1, wherein the array of antenna elements comprises patch elements.

7. The user terminal of claim 1, wherein the multi-beam antenna is configured to operate in millimeter frequency bands or RF bands including RF bands near and below 6 GHz.

8. The user terminal of claim 1, wherein the N-to-N K-muxing transform is one of a Fourier Transform, a transform by a Hadamard matrix operation, a transform by an orthogonal matrix operation, and a transform by a full-rank non-orthogonal matrix operation.

9. The user terminal of claim 1, wherein the modulators in the bank of modulators are configured with a modulation scheme being one of QPSK, 8-PSK, and QAM.

10. A user terminal for receiving from a plurality of access points a plurality of signal streams corresponding to an original data stream, comprising:
 a multi-beam antenna comprising:
  beam forming networks for forming receive beams directed at the access points; and
  an array of antenna elements coupled to the beam forming networks for receiving the signal streams from the access points concurrently; and
 a post-processor coupled to the multi-beam antenna, comprising:
  a bank of demodulators to convert the signal streams into data streams;
  a K-demuxing unit to perform a N-to-N K-demuxing transform on the data streams to generate a plurality of K-demuxed data streams, N being an integer greater than 1, each of the K-demuxed data streams being a linear combination of the data streams; and
  a channel bonding unit to combine the K-demuxed data streams to recover the original data stream.

11. The user terminal of claim 10, wherein the receive beams include a first receive beam having a first beam width and a second receive beam, the first receive beam being directed at a first of the access points and the second receive beam being directed at a second of the access points.

12. The user terminal of claim 11, wherein the first and second of the access points are spatially separated by an angular distance greater than the first beam width, and wherein the first and second of the access points operate at substantially same frequency.

13. The user terminal of claim 10, wherein the access points transmit data received from cloud in the plurality of signal streams.

14. The user terminal of claim 10, wherein the array of antenna elements is configured as a linear array or a planar two-dimensional array or a non-planar distributed array.

15. The user terminal of claim 10, wherein the multi-beam antenna is configured to operate in millimeter frequency bands or RF bands including RF bands near and below 6 GHz.

16. The user terminal of claim 10, wherein the K-demuxing transform is one of an Inverse Fourier Transform, a transform by a Hadamard matrix operation, a transform by an orthogonal matrix operation, and a transform by a full-rank non-orthogonal matrix operation.

17. The user terminal of claim 10, wherein the multi-beam antenna further comprises:
 a beam controller coupled to the beam forming networks to determine pointing directions of the receive beams dynamically.

18. The user terminal of claim 10, wherein the beam forming networks form at least one diagnostic beam to hop over a number of beam positions to find a direction of one of the access points.

19. The user terminal of claim 10, wherein the demodulators in the bank of demodulators are configured with a demodulation scheme being one of QPSK, 8-PSK, and QAM.

20. The user terminal of claim 10, wherein the K-demuxing unit comprises FFT chips.

* * * * *